(12) United States Patent
Roos

(10) Patent No.: US 8,536,723 B2
(45) Date of Patent: Sep. 17, 2013

(54) INTEGRATED HYDROELECTRIC POWER-GENERATING SYSTEM AND ENERGY STORAGE DEVICE

(75) Inventor: Paul W. Roos, Delray Beach, FL (US)

(73) Assignee: American Hydro Jet Corporation, Racine, WI (US)

(*) Notice: Subject to any disclaimer, the term of this patent is extended or adjusted under 35 U.S.C. 154(b) by 702 days.

(21) Appl. No.: 12/691,456

(22) Filed: Jan. 21, 2010

(65) Prior Publication Data

US 2010/0181771 A1    Jul. 22, 2010

Related U.S. Application Data

(60) Provisional application No. 61/146,182, filed on Jan. 21, 2009.

(51) Int. Cl.
  H02K 7/18    (2006.01)
(52) U.S. Cl.
  USPC .................................. 290/52; 290/54; 290/55
(58) Field of Classification Search
  USPC ........................................................... 290/52
  See application file for complete search history.

(56) References Cited

U.S. PATENT DOCUMENTS

| 2,246,472 A | 6/1941 | Sharp |
| 4,364,228 A | 12/1982 | Eller |
| 4,558,228 A | 12/1985 | Larjola |
| 5,140,170 A * | 8/1992 | Henderson ...................... 290/44 |
| 6,407,466 B2 | 6/2002 | Caamano |
| 6,900,553 B2 * | 5/2005 | Gozdawa ........................ 290/52 |
| 6,995,479 B2 | 2/2006 | Tharp |
| 7,073,872 B2 * | 7/2006 | Tagome et al. .................. 303/3 |
| 7,235,894 B2 | 6/2007 | Roos |
| 7,372,172 B2 * | 5/2008 | Winkler et al. ................. 290/43 |
| 7,385,303 B2 | 6/2008 | Roos |
| 7,667,419 B2 * | 2/2010 | Fukamizu et al. ....... 318/400.34 |
| 8,294,290 B2 * | 10/2012 | da Silva ........................ 290/52 |
| 2008/0061559 A1 * | 3/2008 | Hirshberg ...................... 290/55 |
| 2008/0088135 A1 | 4/2008 | Novo Vidal |
| 2009/0008936 A1 * | 1/2009 | Dooley ............................ 290/7 |
| 2009/0134623 A1 | 5/2009 | Krouse |

OTHER PUBLICATIONS

Excerpts of International Search Report and Written Opinion for PCT/US2010/01997. Date: Nov. 15, 2010. 8 pages.

* cited by examiner

*Primary Examiner* — Michael Zarroli
(74) *Attorney, Agent, or Firm* — Jansson Munger McKinley & Shape Ltd.

(57) ABSTRACT

A hydroelectric power-generating apparatus comprising: (1) a fluid inlet, (2) a diffuser having (a) at least one vane supporting a diffuser hub and (b) a rotor rotatably supported by the diffuser hub and having (i) impeller blades, (ii) an impeller hub, and (iii) a shroud at the periphery of the rotor, the shroud including at least one magnet, and (3) a housing surrounding the shroud and having a rigidly-attached stator including laminations and at least one electrical coil, whereby a flow of fluid through the diffuser and rotor causes the rotation of the rotor and the at least one magnet induces an electric current in the at least one coil.

17 Claims, 25 Drawing Sheets

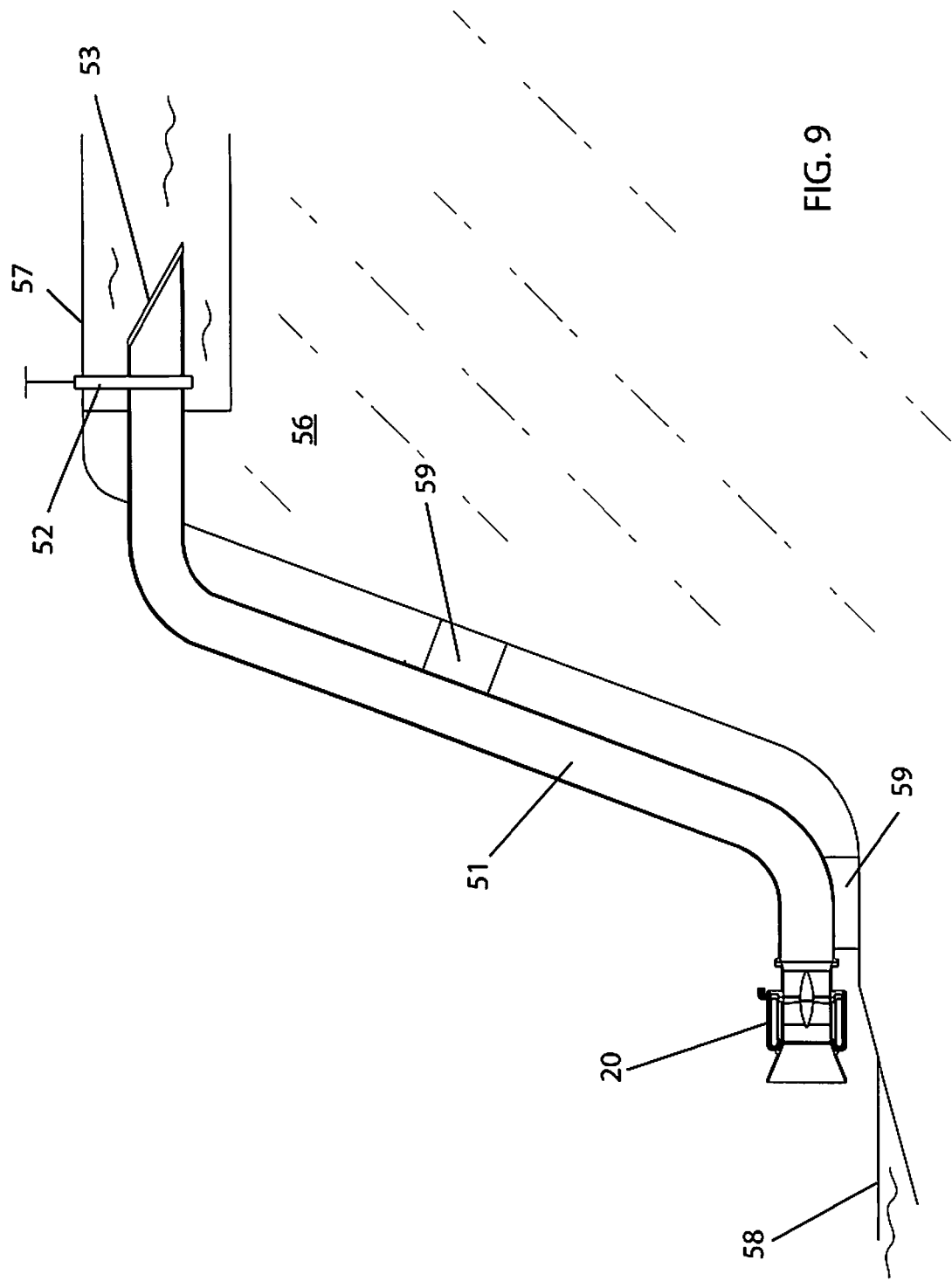

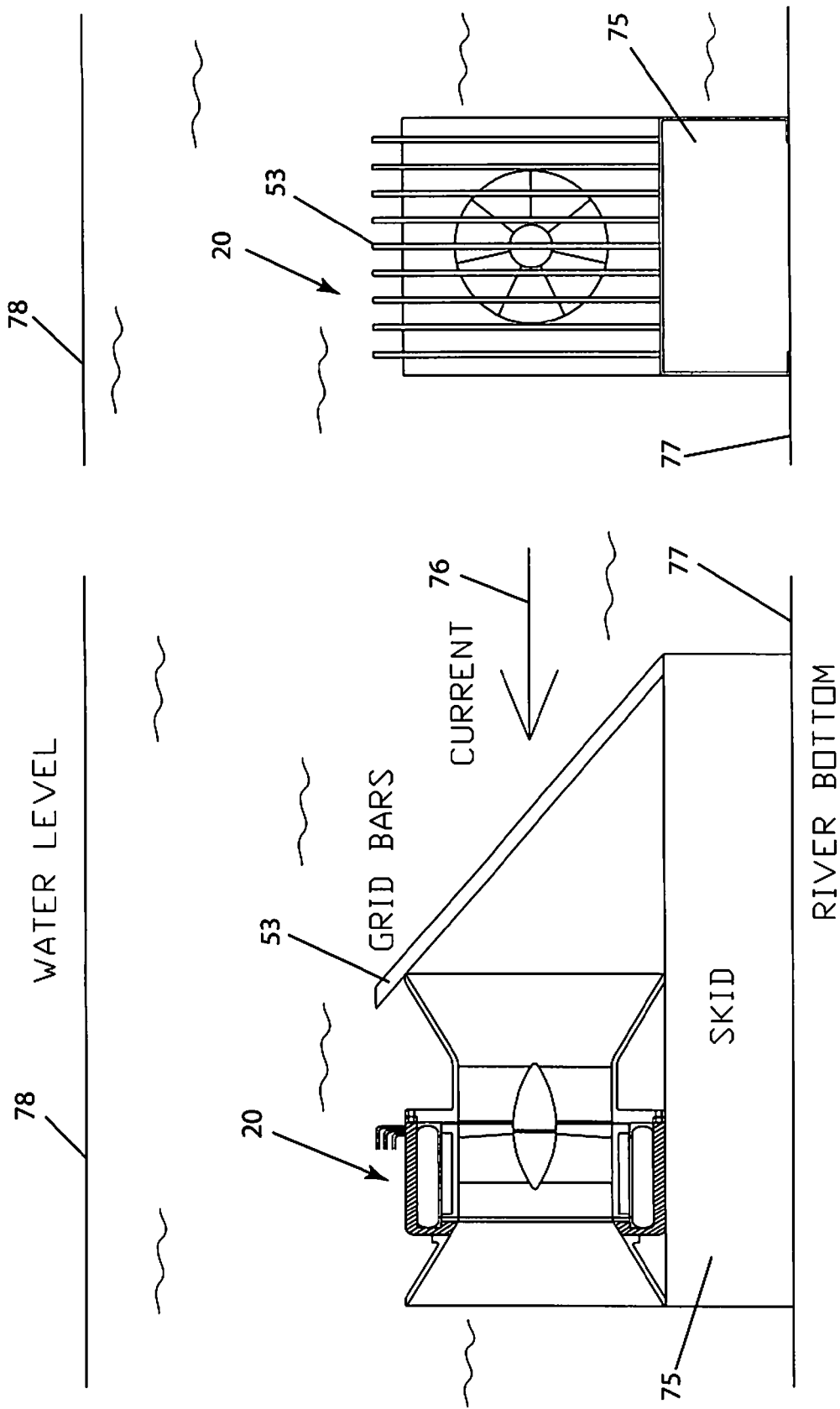

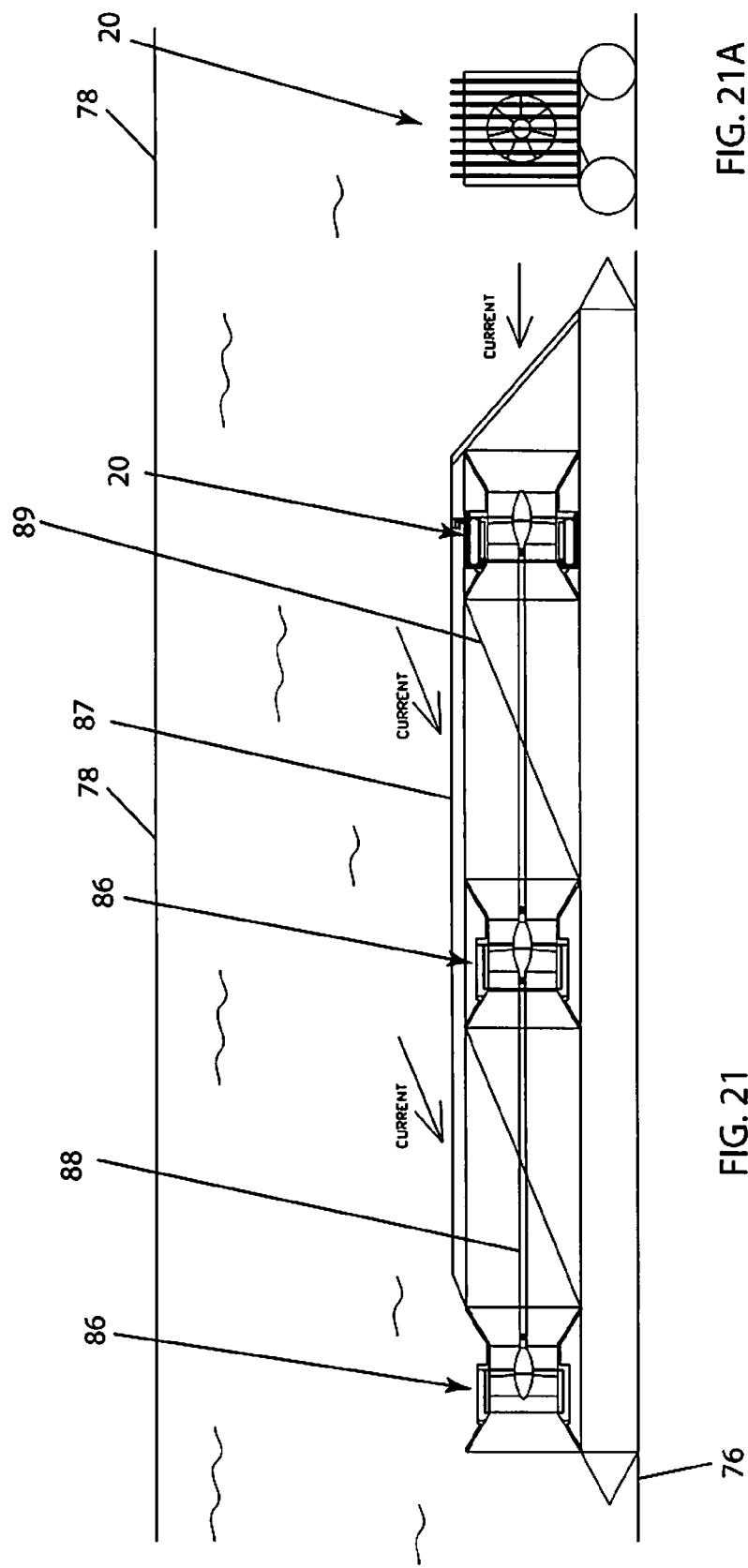

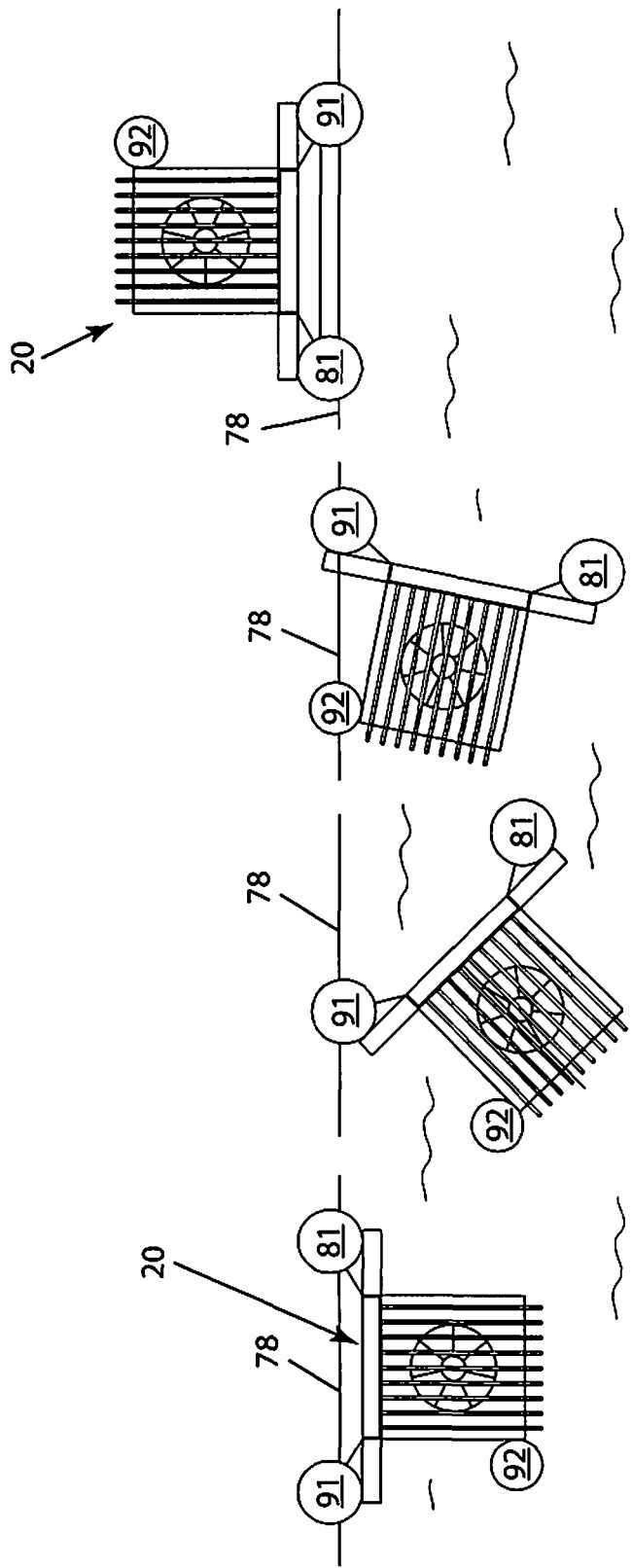

INTEGRATED HYDROELECTRIC POWER-GENERATING SYSTEM AND ENERGY STORAGE DEVICE

RELATED APPLICATION

This application claims the benefit on U.S. Provisional Application 61/146,182 filed on Jan. 21, 2009, the entire contents of which are incorporated herein by reference.

FIELD OF THE INVENTION

This invention relates to the low-cost generation of electrical power from waterways and coastal currents.

BACKGROUND OF THE INVENTION

Power generation from waterways and coastal currents is well-known and commonly practiced in coastal waters and rivers. A well-known application is in dams with built-in turbines driving generators for the production of electric power. Most navigable waterways have a controlled water level to facilitate shipping by maintaining minimum depths through the placement of dams in the waterway. Shipping is made possible through the location of locks adjacent to the dams.

The Mississippi River is an example of such a waterway with a controlled water level and a system of dams with locks. The water drop at most dams is 20 feet or less. One dam and lock has a drop of 38 feet and has been provided with a hydroelectric power plant taking power from the waterway. The 38 feet of static head provides an opportunity to produce power efficiently since the head is substantially greater than the other dams in this waterway. The static head in all other dams was not sufficient to provide a return-on-investment for a conventional hydroelectric power plant in conjunction with these dams.

The placement of dams also reduces and evens out the speed of the water flow, a benefit for the waterway shipping industry. Since flowing water has kinetic energy, it can also be used for power generation. However, the power level of an in-stream power-generating system is much smaller than what can be generated by a static-head-type turbine as mentioned above.

Both low-static-head and in-stream systems have traditionally not attracted interest because the cost of building the conventional equipment to generate this power was very high in relation to the benefit of the power produced. The present invention reduces the cost of the power-generating equipment to such a low level that power can now be efficiently and cost-effectively produced using existing dams with low static heads as well as waterways with a current.

Traditional generating systems consist of a turbine placed on a base, and the turbine is connected to a generator via a shaft and a coupling placed on that same base. In the case of an in-stream turbine, the turbine is suspended under a float with the electric generator, usually driven by a belt, placed on the float (where it is dry). The presence of a float makes it vulnerable to debris, waves and ice in a waterway as well as adding cost. The present invention lowers the cost of such an in-stream system such that it becomes economically feasible to generate electric power in this fashion. Also, the method of installation of such a system is greatly simplified. This invention allows efficient, low-cost power generation for both low-pressure static-head and in-stream systems that are not possible with conventional systems.

The cost reduction is accomplished by integrating the turbine and the electric power generator in one compact unit made of composite materials to keep both cost and weight low. It is modular in design, allowing combinations of components to select a match for the power requirement of a given application. It fits in-line with water ducts for easy installation and maintenance. It is submersible and can be suspended in a water current in ways that are not possible or practical with a separate turbine and generator.

Most conventional hydroelectric power generation systems do not have the capability of reversing the operation and turning the power generation system into a pumping system by applying an electric current to the generator. The present invention allows the electric generator to become an electric motor by reversing its function by changing the electronic commutation. The axial flow turbine functions equally well as a pump so that the inventive system can be used to store energy by applying to the unit electric power to be stored and pumping water from one reservoir to a higher-elevation reservoir. When the electronic commutation is reversed once again, it turns the power system back into a generator and so can recover the stored power. Therefore, unlike most conventional hydroelectric power generators, the present invention can be used as an energy storage and recovery system.

OBJECTS OF THE INVENTION

It is an object of this invention to provide a low-cost hydroelectric power-generating system which takes power from current in a waterway or coastal current that can efficiently produce electricity to economic benefit.

Another object of this invention is to produce a low-cost hydroelectric power-generating system that is fast and easy to install and service.

It is a further object of this invention to produce a low-cost hydroelectric power-generating system that permits applications that are conventionally not possible because of:
- physical constraints (no room to locate);
- environmental constraints (conventional system too disturbing);
- economic constraints (too costly to provide a positive return-on-investment);
- no option to use the power-generating system as an energy storage device; and
- a combination of the above.

It is a further object of this invention to produce a low-cost hydroelectric power-generating system that can efficiently make use of a static head in a waterway to produce electricity to economic benefit.

Another object of this invention is to produce a low-cost hydroelectric power-generating system that can be reversed to store energy by pumping water to a higher level and recover the stored energy when needed by switching back to power generation.

Another object of this invention is to produce a low-cost hydroelectric power-generating system that can efficiently make use of the static head of an existing dam to produce electricity to economic benefit without disturbing the existing dam structure.

Another object of this invention is to use the unique design that is efficient over a wide power range covering the full range of in-stream and static head inputs.

Another object of this invention is to maintain efficiency with higher static pressure heads by cascading two or more turbine/generator units in series.

Another object of this invention is to produce a low-cost hydroelectric power-generating system that can efficiently make use of a weir without the use of a duct.

Another object of this invention is the avoidance of the need to build a dam in order to capture the power-generating capability of a waterway.

Another object of the present invention is to provide the capability to use the same mechanical design adaptable to providing either AC or DC current by selecting appropriate power electronics.

Another object of the present invention is easy maintenance, whereby:
- a static-head unit placed in-line with a penstock is easily replaceable;
- a sliding mechanism that allows the extraction of the generator is provided for easy service; and
- an in-stream unit utilizes controllable flotation to enable easy above-water service.

Another object of the present invention is to provide a low-cost hydroelectric power-generating system with the following features:
- power generation with a turbine/generator having only one moving part;
- low unit weight eliminating or reducing the need for a foundation;
- in-line installation;
- simple electronics packaged on the unit;
- the use of composite materials; and
- non-corrosive, submersible unit configuration.

Another object of the present invention is to provide a low-cost hydroelectric power-generating system that has the capability of in-stream power generation under all weather conditions, including high waves and the presence of debris and ice formation.

Another object of the present invention is to provide a low-cost hydroelectric power-generating system that siphons water over a dam without altering the structure of dam and which primes the siphon with pumped water or by applying a vacuum.

Another object of the present invention is to provide a low-cost hydroelectric power-generating system that uses selectable electrical poles and pole segments to provide a wide range of power levels with the same hydraulic hardware.

Yet another object of the present invention is to provide a low-cost hydroelectric power-generating system that has the capability of being transported and launched from a trailer at a boat ramp.

These and other objects of the invention will be apparent from the following descriptions and from the drawings.

SUMMARY OF THE INVENTION

The present invention is hydroelectric power-generating apparatus comprising: a fluid inlet; a diffuser having (1) vanes supporting a diffuser hub and (2) a rotor rotatably supported by the diffuser hub and having impeller blades, an impeller hub, and a shroud at the periphery of the rotor, the shroud including at least one magnet mounted thereto; and a housing surrounding the shroud and having a rigidly-attached stator including laminations and at least one electrical coil. A flow of fluid through the diffuser and rotor causes the rotation of the rotor, and the at least one magnet induces an electric current in the at least one coil.

In some preferred embodiments of the inventive hydroelectric power-generating apparatus, the diffuser is removably attached to the housing. In some preferred embodiments of the inventive hydroelectric power-generating apparatus, the stator is encapsulated with composite material to prevent fluid contact with the laminations and the at least one coil. Also, in some preferred embodiments, the housing has cooling grooves to cool the stator.

In other preferred embodiments of the inventive hydroelectric power-generating apparatus, the stator is segmented, and in some of these embodiments, the stator segments and the at least one coil are removable. In other such embodiments, the stator segments are held in place by spacer segments removably fastened to the housing.

In other preferred embodiments, of the hydroelectric power-generating apparatus, the at least one rotor magnet is held in place by a band around the shroud, and in yet other preferred embodiments of the inventive hydroelectric power-generating apparatus, the rotor is segmented, and each rotor segment has one or more impeller blades.

In highly-preferred embodiments of the inventive hydroelectric power-generating apparatus, the at least one magnet is placed at the tip(s) of the one or more impeller blades.

In highly-preferred embodiments, the inventive hydroelectric power-generating apparatus further includes an electronic commutation controller configured to reduce or increase the generator output by increasing or reducing torque load to control the water flow through the generator.

In some embodiments, the electronic commutation controller is connected to the at least one coil and configured to maintain a fixed AC output frequency by controlling the torque load on the stator. In some embodiments, the electronic commutation controller is connected to the at least one coil and configured to maximize the generator output as the fluid flow varies. In other embodiments, the electronic commutation controller is connected to the at least one coil and configured to switch from a power-generation mode to an electric motor mode, thereby changing the turbine into a pump.

In some preferred embodiments, the inventive hydroelectric power-generating further includes a penstock connected to the fluid inlet, directing fluid from an upstream fluid level through the hydroelectric power-generating apparatus to a lower downstream fluid level. In some embodiments, the apparatus is placed below the lower downstream fluid level, and the function of the hydroelectric power-generating apparatus is reversed by applying an electric current to the at least one coil, thereby causing the apparatus to pump fluid up the penstock to the upstream fluid level, thereby storing power. In some of these embodiments, the penstock is configured as a siphon reaching up to the upstream fluid level to siphon water into the penstock, and in some of these embodiments, the apparatus function is reversed, causing the apparatus to pump fluid up the penstock and siphon to the upstream fluid level until the siphon is primed.

In other embodiments, the inventive hydroelectric power-generating apparatus further includes a shut-off valve placed between the apparatus and the penstock, and a fluid supply valve placed in the siphon, such that when the shut-off valve is closed and fluid is supplied through the fluid supply valve, the penstock fills with fluid until the penstock overflows, thereby priming the siphon. Some of these embodiments include a vacuum pump to prime the siphon by drawing a vacuum at the high point of the siphon.

In some embodiments of the inventive hydroelectric power-generating apparatus, the apparatus is placed at the base of a weir, and in some of these embodiments, the apparatus configured to be removably attached to the weir. Further, the apparatus may include a slide mechanism supporting the apparatus and allowing the apparatus to be moved from an operating position into a service position.

In other embodiments of the inventive hydroelectric power-generating apparatus, the apparatus is submersed in the fluid flow and the flow drives the apparatus. In some of these embodiments, the apparatus is mounted on a skid, and in other such embodiments, the entire apparatus is configured to rotate in the waterway to align itself with the fluid flow to capture maximum flow.

In other embodiments if the inventive hydroelectric power-generating apparatus further include at least one float on which the apparatus is placed.

In some preferred embodiments of the invention, hydroelectric power-generating apparatus including a turbine and generator is mounted on a skid for submersed operation on the bottom of a waterway. Some of these embodiments include a plurality of turbines rotatably connected to the generator substantially in-line thereto via one or more couplings and one or more drive shafts to increase the total power generated by the apparatus. In other of these embodiments, the plurality turbines is connected to the generator via drive belts.

In some other preferred embodiments of the invention, hydroelectric power-generating apparatus, including at least one submersible float, thereby enabling the apparatus to be submerged. Some of these embodiments include a plurality of turbines rotatably connected to the generator substantially in-line thereto via one or more couplings and one or more drive shafts to increase the total power generated by the apparatus. In other of these embodiments, the plurality turbines is connected to the generator via drive belts. In other preferred embodiments, the hydroelectric power-generating apparatus, a gas is used to control the submersion and floatation of the at least one float. In yet other such embodiments, a buoy is connected to the at least one float to indicate the location of the apparatus while submerged, and a gas connection may be employed to control the submersion and floatation of the at least one float. Further, in some of these embodiments, the hydroelectric power-generating apparatus further includes at least two floats, and the apparatus is further configured to revolve to place the apparatus in an above-water service position.

On other embodiments, the hydroelectric power-generating apparatus which includes at least one float is configured to be launched and retrieved from a trailer.

Other preferred embodiments of the present invention include a plurality hydroelectric power-generating devices placed in series in a penstock which directs fluid from an upstream fluid level through the hydroelectric power-generating devices downstream, each device having: a fluid inlet; a diffuser having (1) at least one vane supporting a diffuser hub and (2) a rotor rotatably supported by the diffuser hub and having impeller blades, an impeller hub, and a shroud at the periphery of the rotor, the shroud including at least one magnet mounted thereto; and a housing surrounding the shroud and having a rigidly-attached stator including laminations and at least one electrical coil. A flow of fluid through the diffuser and rotor causes the rotation of the rotor, and the at least one magnet induces an electric current in the at least one coil.

The term "waterway" as used herein includes any body of water such as a river or a canal with a water current flowing through it.

The term "weir" as used herein refers to a fixed or removable barrier placed in a waterway to obstruct free water flow and produce a water level drop downstream, creating a static head between upstream and downstream of the weir. A weir may be provided with a port to allow water flow, and a turbine may be placed over such port to produce electric power.

The term "penstock" as used herein refers to a water feed pipe that provides the connection between the upstream side of a dam, weir or reservoir and a hydroelectric power turbine placed on the downstream side.

Laminates or laminations are thin magnetically-conductive sheet stampings of identical shape, that stacked together, form an electromagnetic flux guide in a plane parallel to the plane of the stampings.

A "dam" as used herein includes an upstream water level, usually at the top of the dam, and a downstream water level at the low side of the dam.

The term "static head" as used herein refers to the difference in elevation between the upstream and downstream water levels of a weir or dam.

The term "electronic commutation controller" as used herein refers to electronic circuitry which provides the function of motor/generator brushes and commutators through electronic switching.

The term "turbine" as used herein refers to rotating apparatus driven by fluid flow.

The term "pump" as used herein refers to rotating apparatus which drives fluid flow.

The term "tailrace" as used herein identifies the water duct downstream of the turbine/generator.

The term "turbine/generator" is used interchangeably herein with the terms "hydroelectric power-generating device" and "hydroelectric power-generating apparatus." All such terms are sometimes, for convenience, referred to simply as a "device" with the corresponding reference number.

BRIEF DESCRIPTION OF THE DRAWINGS

FIG. 4A is an plan view of the lamination segment used in FIG. 4.

FIG. 9 is an elevation partial section of the hydroelectric power generator in an in-line static-head arrangement and applied to a dam.

FIG. 15 is an elevation partial section of the hydroelectric power generator in an in-stream arrangement, with the turbine/generator on a skid on the bottom of a waterway.

FIG. 15A is an end view of the hydroelectric power generator in the arrangement of FIG. 15.

FIG. 18A is an end view of a hydroelectric power generator in the arrangement of FIG. 18.

FIGS. 21 and 21A are elevation partial sections of cascaded in-stream turbine/generators coupled with drive shafts to the integrated turbine/generator on submerged floats.

FIGS. 24A, 24B, and 24C are end views illustrating the method of revolving the float-suspended hydroelectric turbine/generator for inspection and maintenance.

FIG. 24D is an end view of the in-stream hydroelectric power generator arrangement of FIGS. 23A-23C.

DETAILED DESCRIPTION OF PREFERRED EMBODIMENTS

While the principles of this invention have been described in connection with specific embodiments, it should be understood clearly that these descriptions are made only by way of example and are not intended to limit the scope of the invention.

The following detailed specification explains a novel approach to hydroelectric power generation starting with the integration of turbine and generator. This inventive concept will permit the application of hydroelectric power generation previously impossible by allowing configurations of systems previously mechanically impossible and by drastically lowering cost of manufacture, installation and maintenance, making systems efficient that were previously economically not feasible.

Figure 1:
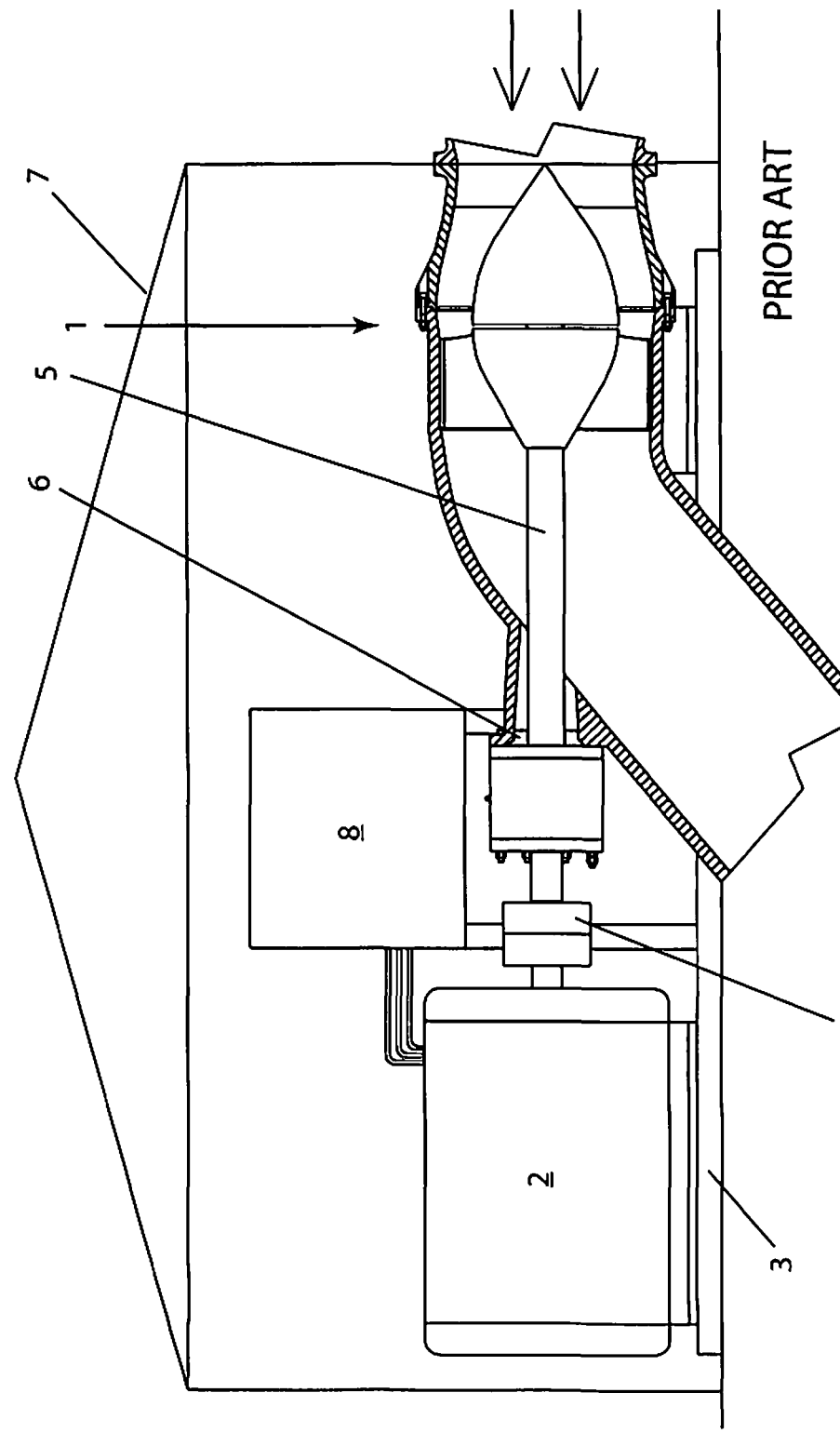
FIG. 1 (PRIOR ART) shows a conventional turbine and generator arrangement.

FIG. 1 (PRIOR ART) shows the conventional way of static-head hydroelectric power generation using a separate turbine 1 and generator 2 mounted on a common base 3 requiring a coupling 4, a shaft 5, and a shaft seal 6. Further, there is the necessity of installation and alignment of turbine 1, shaft 5 and generator 2 on the base 3. This conventional installation requires an enclosure 7 and an electrical control panel 8. A location has to be found or created to place base 3 convenient to the available waterway or dam to maintain the shortest piping runs.

Figure 1A:
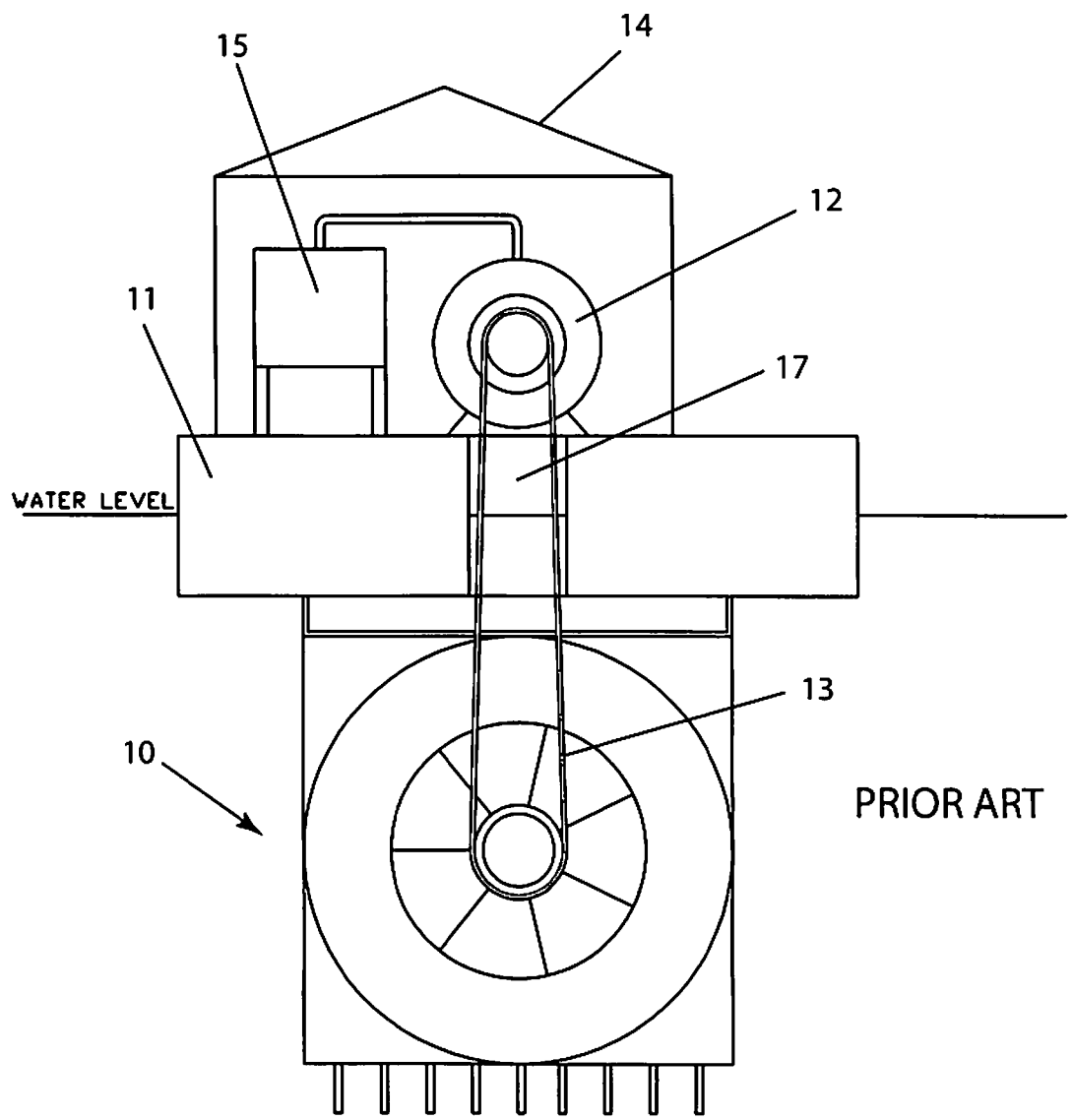
FIG. 1A (PRIOR ART) shows a conventional in-stream turbine driving a generator.

FIG. 1A (PRIOR ART) shows an in-stream hydroelectric power turbine 10 that is suspended below a float 11, driving a generator 12 with a drive belt 13. Generator 12 is placed on float 11 in an enclosure 14 to protect generator 12 and electrical switch gear 15 from the elements. Drive belt 13 connects turbine 10 with generator 12 through an opening 17 in float 11.

Figure 1B:
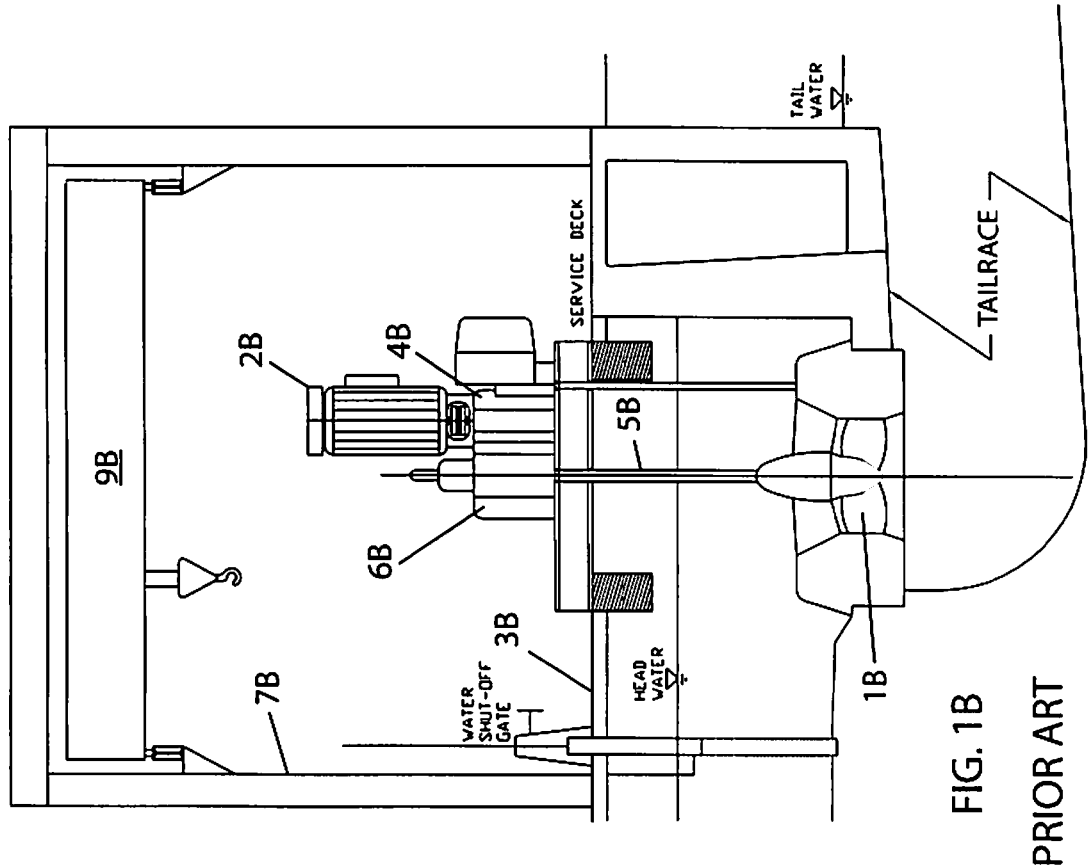
FIG. 1B (PRIOR ART) shows a conventional vertical-shaft hydroelectric turbine and generator configuration.

FIG. 1B (PRIOR ART) shows a conventional vertical-shaft water turbine 1B and a generator 2B in which a shaft 5B connects to a transmission 6B and a coupling 4B connects transmission 6B to generator 2B. Transmission 6B is placed on a base 3B and inside an enclosure 7B with an overhead service crane 9B.

The present invention replaces the conventional design concepts shown in FIGS. 1, 1A and 1B, eliminating the need for all of the components interconnecting the turbine with the generator and replacing these components with a simple configuration having one moving part that can be, but not necessarily is, made primarily of composite materials. The unit can be placed in line with the water flow for low-cost, efficient power generation above or under water. The configuration is capable of handling a wide range of power while keeping costs low by segmenting and modularizing the electric power-generating coils and the permanent magnets. It maintains common dimensions so that, for example, the same 60-inch diameter unit can handle 10 kW or 1500 kW, depending only on the selection of interchangeable components.

Figure 2:
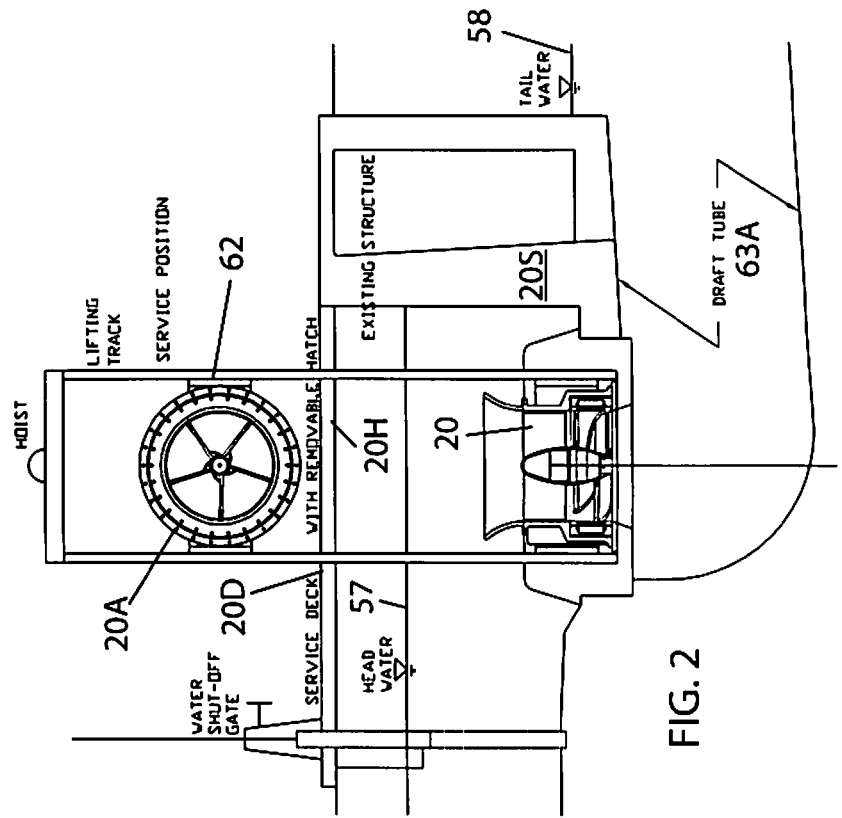
FIG. 2 illustrates the inventive turbine/generator in a vertical-shaft position and having a lifting-track mechanism.

FIG. 2 shows a turbine/generator 20 (also herein referred to as hydroelectric power-generating device 20) oriented vertically above a tailrace 63A. A vertical lifting track 62 enables the lifting of turbine/generator 20 to a position above the tailwater level 58 and the head water level 57. FIG. 2 also shows turbine/generator 20 as turbine/generator 20A in a service position, in this case rotated 90 degrees for access. Turbine/generator 20 is shown mounted as a replacement unit in an existing structure 20S and enclosed under a service deck 20D having a removable hatch 20H.

Figure 3:
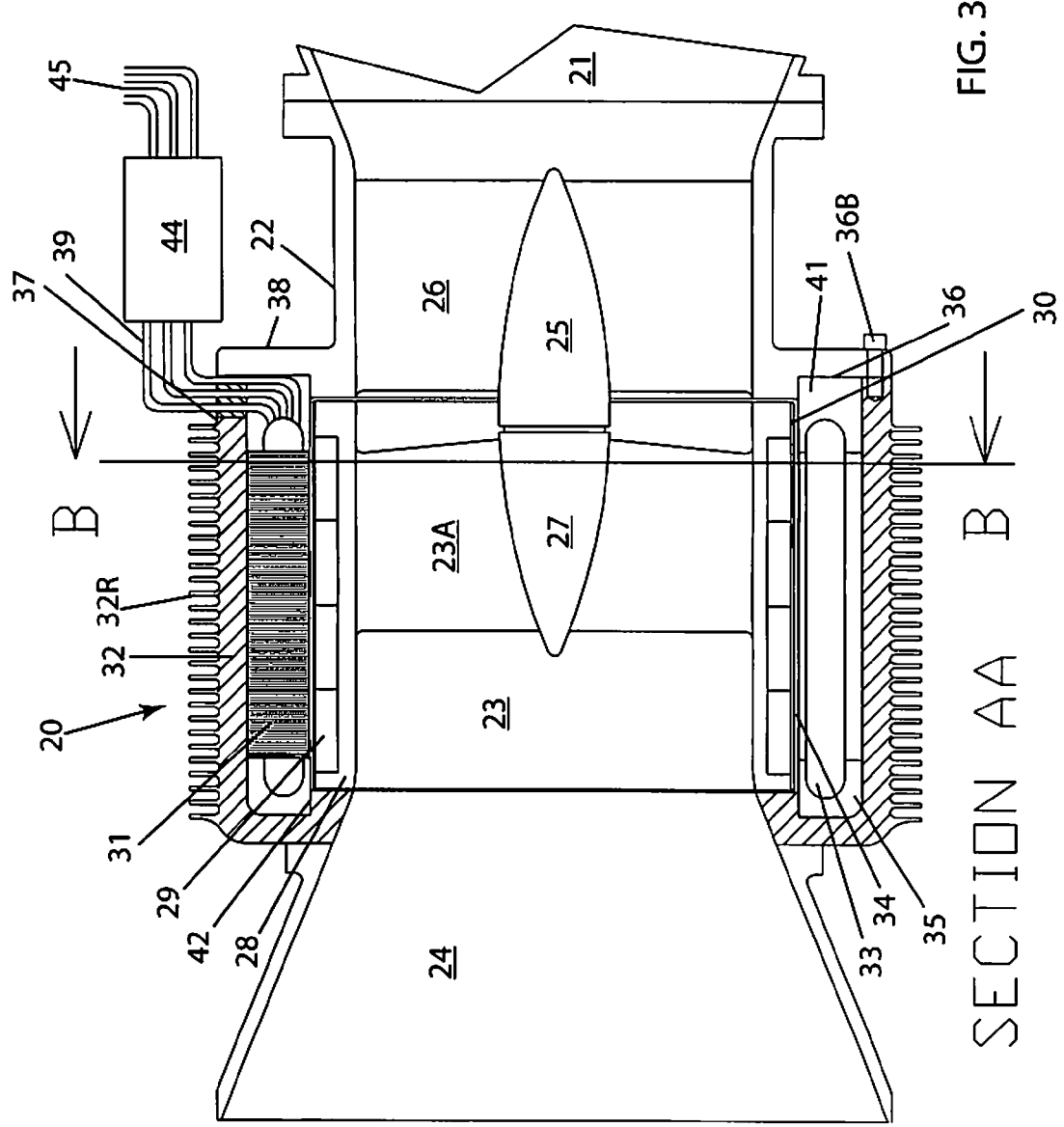
FIG. 3 is a section of the integrated hydroelectric power generator in line with the axis of rotation.
Figure 4:
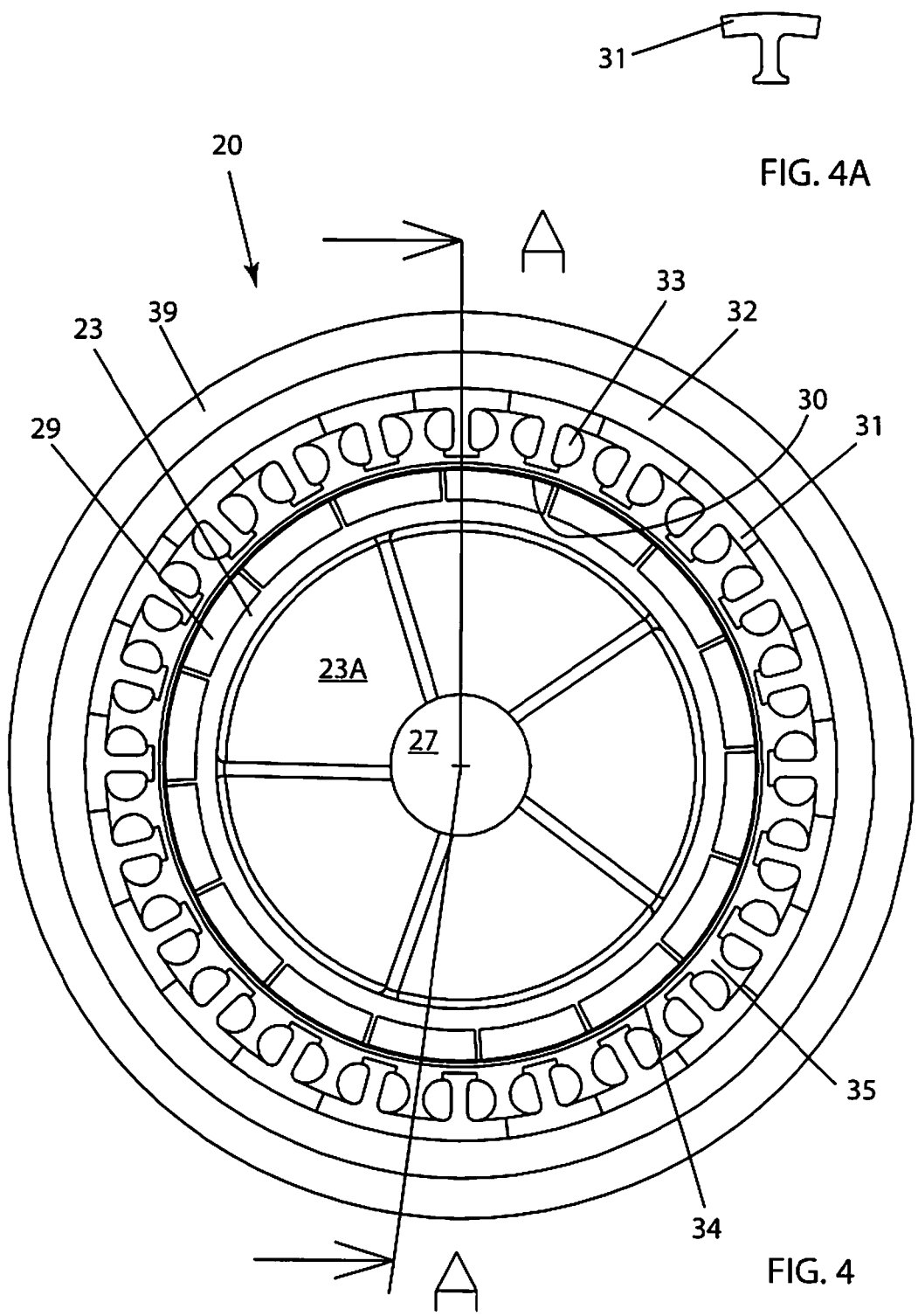
FIG. 4 is a section of the integrated hydroelectric power generator perpendicular to the axis of rotation.

FIG. 3 shows turbine/generator 20 of the present invention in its basic embodiment in elevation section AA (see FIG. 4). FIG. 4 shows hydroelectric power-generating device 20 in elevation section perpendicular to its axis of rotation, also showing section lines BB of FIG. 3. A water supply duct 21 feeds water into a diffuser 22 and through a rotor 23 passing a set of impeller blades 23A and from there to a water discharge duct 24. Rotor 23 is rotatably supported by a hub 25 that in turn is held in place by a plurality of vanes 26 of diffuser 22. Rotor 23 has an impeller hub 27, and an impeller shroud 28 carries a set of permanent magnets 29. A metal band 30 holds magnets 29 in place. Band 30 functions to limit radial expansion which may occur as a result of centrifugal force generated by the mass of impeller blades 23A, shroud 28 and magnets 29 of rotor 23 while rotating. A housing 32 contains a stator 36. Stator 36 contains a set of laminations 31 and a set of coils 33. Laminations 31 and coils 33 are encapsulated with a composite material 35 to prevent contact with water. A set of electric leads 39 from coils 33 pass through a wire lead-out 37. A drawing of a separate lamination 31 segment is shown in FIG. 4A.

Diffuser 22 and a housing 32 are removably joined by a flange 38 of diffuser 22 to allow disassembly of the hydroelectric power-generating device 20. A set of bolts 36B holds diffuser 22 firmly to housing 32 while axial alignment is maintained by one or more register surface 41. At the opposite end of device 20, stator 36 is aligned by a register surface 42.

A gap 34 is maintained between band 30 and composite encapsulating material 35 of stator 36 to avoid mechanical contact between rotating and stationary parts.

When water flows through intake 21 and diffuser 22, its passage through rotor 23 will cause impeller blades 23A, hub 27 and shroud 28 to rotate, moving magnets 29 past laminations 31 and inducing a electric current in coils 33. Water will also flow through gap 34 between encapsulation material 35 and band 30, effectively cooling stator 36 and housing 32 and magnets 29 from inside device 20. Cooling is also effected by a set of cooling fins 32R placed about the periphery of the housing 32.

Figure 5:
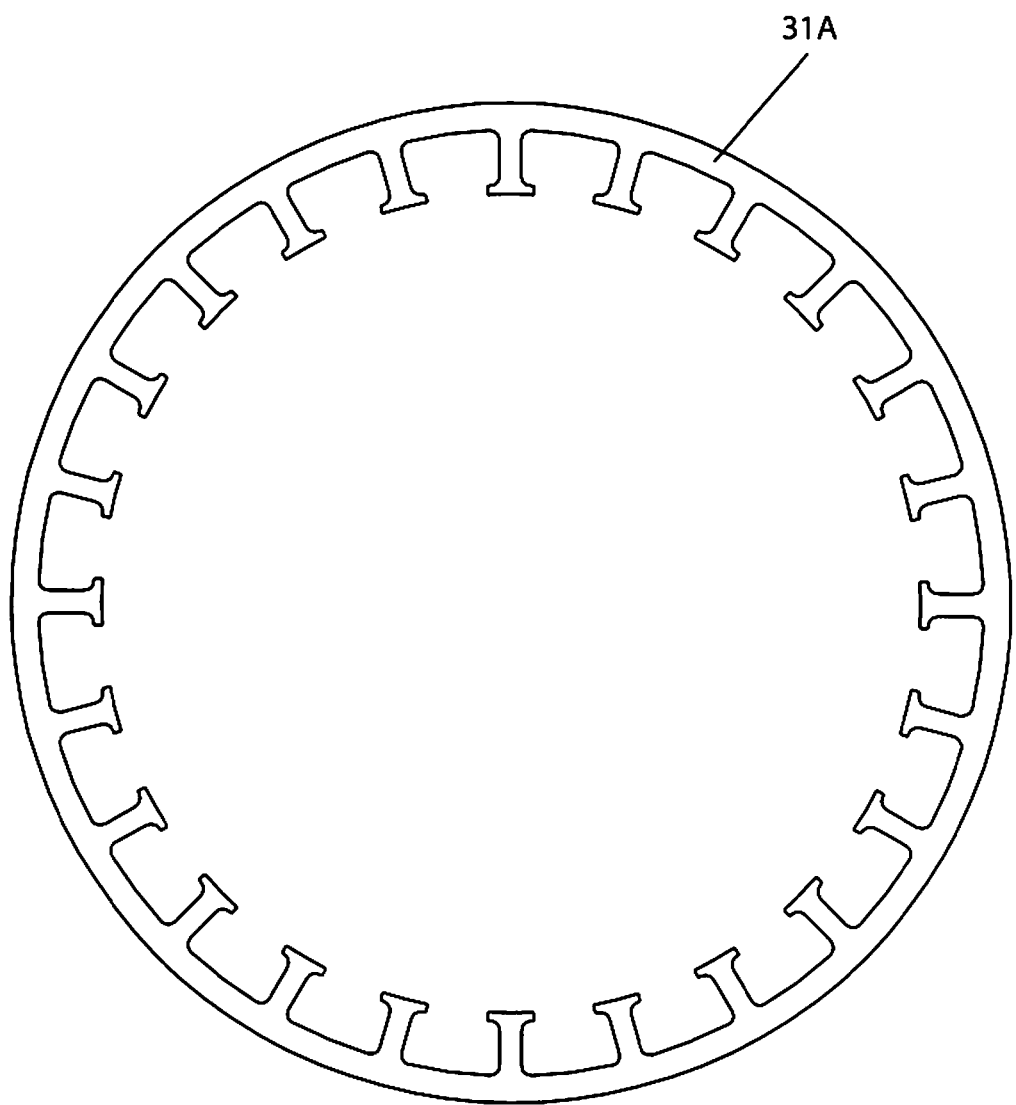
FIG. 5 is an end view of a continuous circular lamination.
Figure 6A:
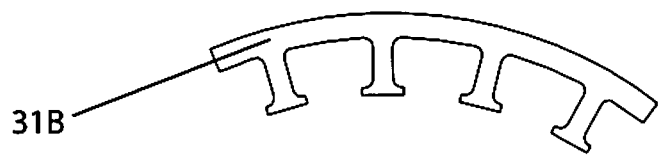
FIG. 6A is an end view of the lamination segment used in FIG. 6.
Figure 6:
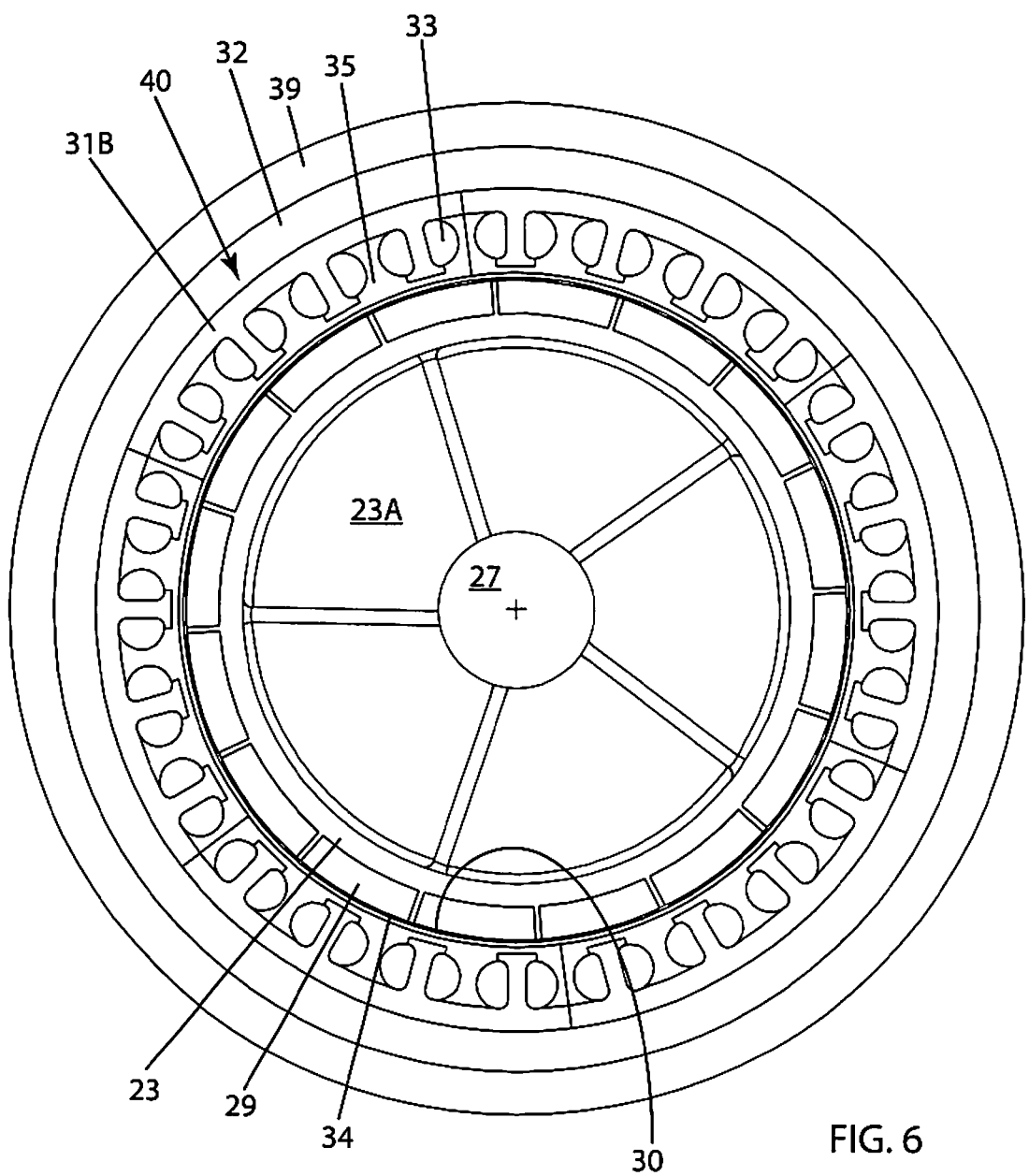
FIG. 6 is a section of the integrated hydroelectric power generator perpendicular to the axis of rotation, showing the segmented stator in large segments.

Laminations 31 may be in the form of a continuous ring 31A as shown in FIG. 5 or in segments (also numbered 31) as shown in FIGS. 4 and 4A in which each lamination segment 31 holds one coil 33. Alternatively, as shown in FIGS. 6 and 6A, lamination segments 31B each hold multiple coils 33.

FIGS. 3, 4 and 5 show generating systems set up for maximum power generation using a full complement of coils in device 20. Many applications of this invention may operate at power levels significantly lower than the maximum possible power for a specific diameter of turbine/generator 20. It is a cost advantage to use the same radial dimensions while lowering the power load significantly. One method of lowering the power output is to reduce the stack height of laminations 31 while maintaining the radial dimensions and turbine geometry of device 20. A more efficient way is to limit the number of coils 33 and the span and number of lamination segments 31, 31A or 31B placed in housing 32. This is done by segmenting stator 36 and laminations 31B and coils 33 as shown in FIG. 6. As shown and labeled, assembled stator 40 includes laminations 31, 31A or 31B, coils 33, and composite material 35. Manufacturing stator segments 40 as segments significantly lowers the cost of manufacture when compared to producing stators 40 using continuous laminations 31.

Figure 7:
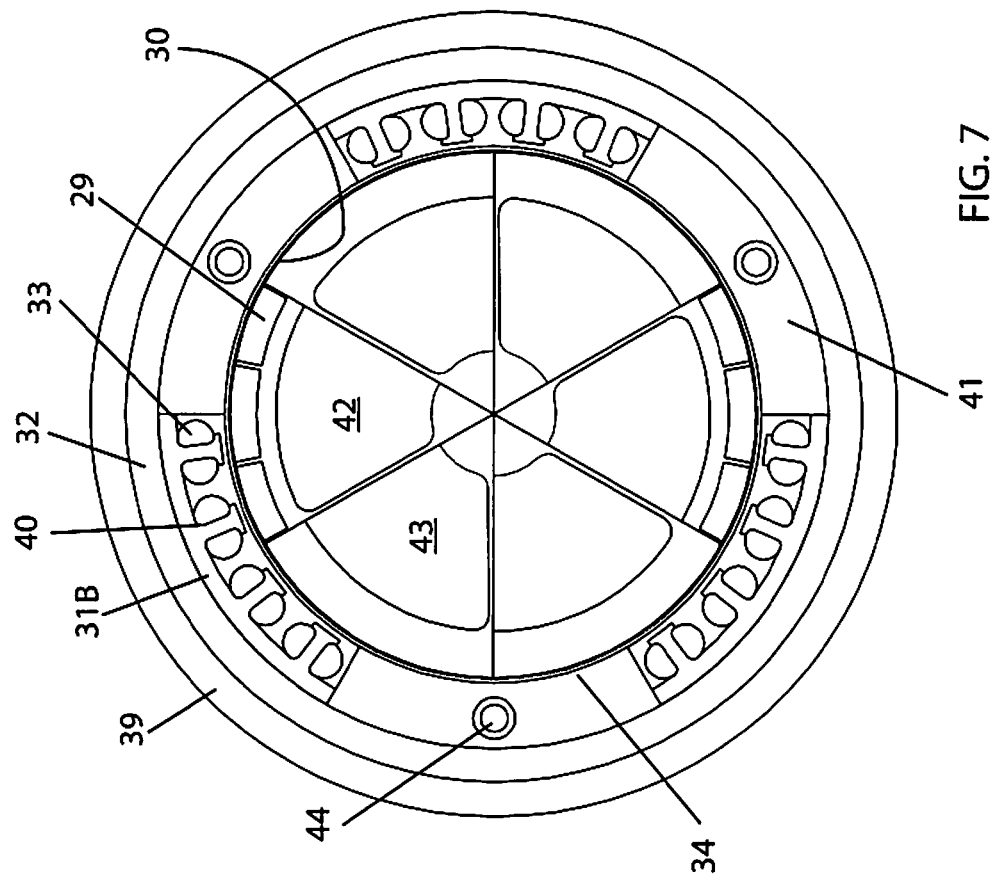
FIG. 7 is a section of the integrated hydroelectric power generator perpendicular to the axis of rotation, showing the segmented rotor and segmented stator.
Figure 7A:
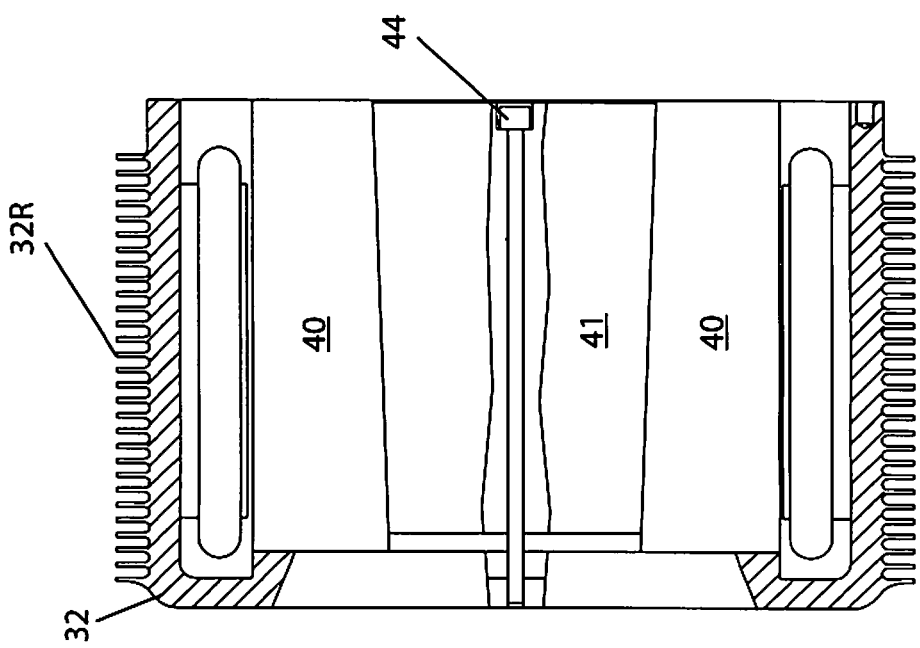
FIG. 7A shows the tapered segments and fasteners.

As shown in FIG. 7, a number of stator segments 40 can be removed and replaced with spacer segments 41 positioning stator segments 40. Similarly, rotor magnets 29 can be placed at intervals to decrease the torque load on rotor 23 and consequently, the power generated. It is important to maintain a constant torque load throughout a single revolution to keep rotor 23 speed constant. In order to be able to maintain stator segments 40 fixed in place while being replaceable, segments 40 are wedged in place by spacer segments 41 not containing laminations or coils, and these are in turn held in place by fasteners 44. FIG. 7A shows stator segments 40 and spacer segments 41 as well as the tapered shape of these parts so that tightening fastener 44 causes all segments to compress inside housing 32. Stator segments 40, like stator 36, are encapsulated in composite material 35 to eliminate water penetrating coils 33 and laminations 31, 31A or 31B. Coil lead wires 39 are sealed by a wire lead-out 37 (see FIG. 3) through which they pass out of stator segments 40. The high cost of circular laminations 31 shown in FIG. 5, especially in larger diameters, favor the segmented configurations as shown in FIGS. 6 and 7.

FIG. 7 also illustrates that rotor 23 consists of rotor segments 42 and 43 each carrying one impeller blade 23A. Only segments 42 carry magnets 29 in their peripheries. Band 30 holds magnet segments 42 and magnetless rotor segments 43 in place.

Figure 8C:
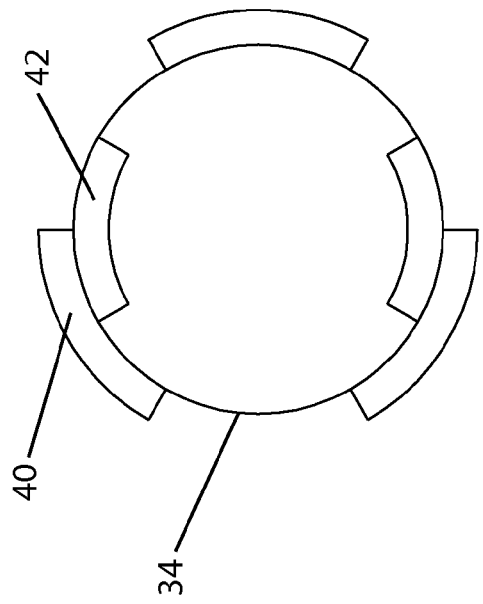
FIGS. 8A, 8B, 8C and 8D are block representations of combinations of stator and rotor arrangements in a reduced-power arrangement.
Figure 8D:
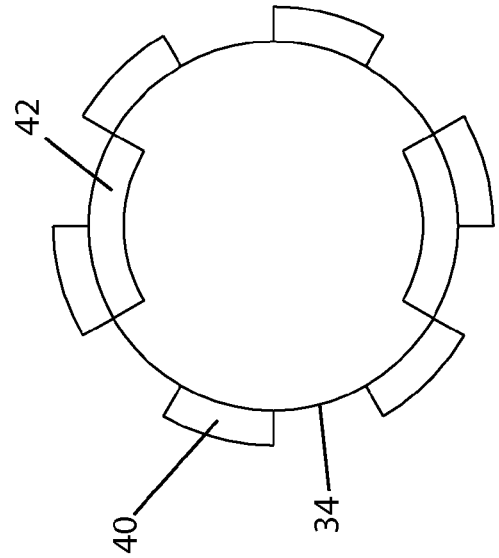
Figure 8A:
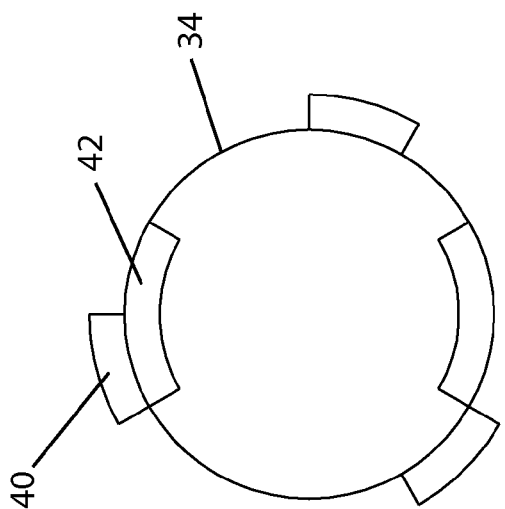
Figure 8B:
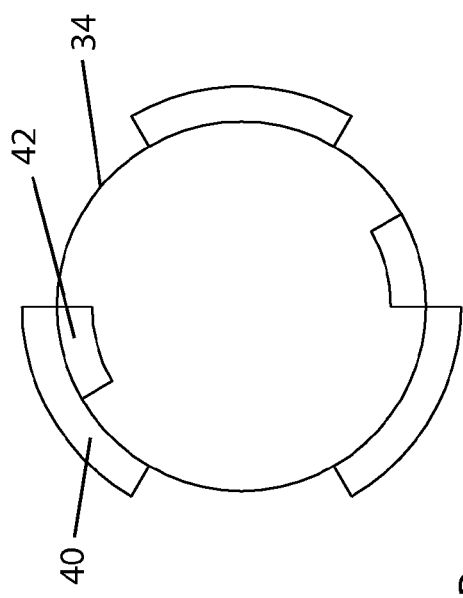

FIGS. 8A, 8B, 8C and 8D show, in schematic form, various arrangements of stator segments 40 external to circle at gap 34 and rotor segments 42 internal to this circle that provide a continuous and constant torque load during each revolution. FIG. 8A shows a minimal number of stator segments 40; FIG. 8B shows minimal rotor magnet segments 42; FIG. 8C shows same-sized rotor segments 43 and magnet segments 42; and FIG. 8D shows an arrangement with symmetrical torque load.

Referring again to FIG. 3, power leads 39 of stator 36 and each stator segment 40 are connected to a solid-state commutation controller box 44 attached to hydroelectric power-generating device 20. The output connection to an inverter (not shown) is through leads 45. The inverter (not shown) produces AC power from DC power by means well known to those skilled in the art.

The large number of poles, possible because of the diameter being large compared to that of a conventional generator, allows a wide range of DC voltage output and provides for optimization of power output over a wide range of speeds.

Electronic commutation control unit 44 is configured as a complete unit, is encapsulated and carries cooling fins so that it can operate above or under water or outside in all weather conditions. Electronic commutation controller 44 can be adjusted according to three possible power delivery modes:

1) Controller 44, operating in AC mode, maintains constant rotor 23 speed (i.e., frequency). It controls torque to maintain constant speed to match the frequency of alternating current without the use of an inverter. The power delivery varies depending on water flow. Output voltage depends on power generated and may have to be transformed to a higher voltage of the power grid being supplied.

2) Controller 44, operating in DC max-power mode, that provides optimal load (kW) under varying speed. This option will deliver the highest amount of power possible for a given water flow. It has DC output. Charge battery bank or be converted to AC via an inverter.

3) Controller 44, operating in DC demand mode, provides output control by controlling the speed through torque load control to minimize water flow during low-kW demand for power from the generator. Output is DC. It may charge a battery bank or be converted to AC via an inverter.

Integrated turbine/generator 20, employing a single moving part (rotor 23), allows the main components of device 20 to be made of composite materials, reducing cost, weight and corrosion. The modulus of elasticity of composite materials is significantly lower than that of metal. The inventive apparatus makes certain that any deflection under load is absorbed in a way that will not affect axial alignment of stator 36 and rotor 23.

Here follow typical applications that make use of the unique features of the invention. Axial flow water turbines are generally capable of handling static heads from a few feet to up to 50 feet efficiently. FIG. 9 shows turbine/generator 20 installed in a typical static head installation. A dam 56 retains water at an upstream level 57. The static head created by dam 56 is the height differential between upstream level 57 and a downstream level 58. A penstock 51 feeds water to device 20 via intake a set of grid bars 53 and a shut-off valve 52. Penstock 51 is supported by several pipe supports 59. Because of this unique configuration, turbine/generator 20 is light weight and makes it possible for it to be placed in-line at the end of penstock 51 in a cantilevered fashion without needing a mounting base or its own supports. Device 20 is removably attached to penstock 51 in a manner well-known in the art.

Figure 9A:
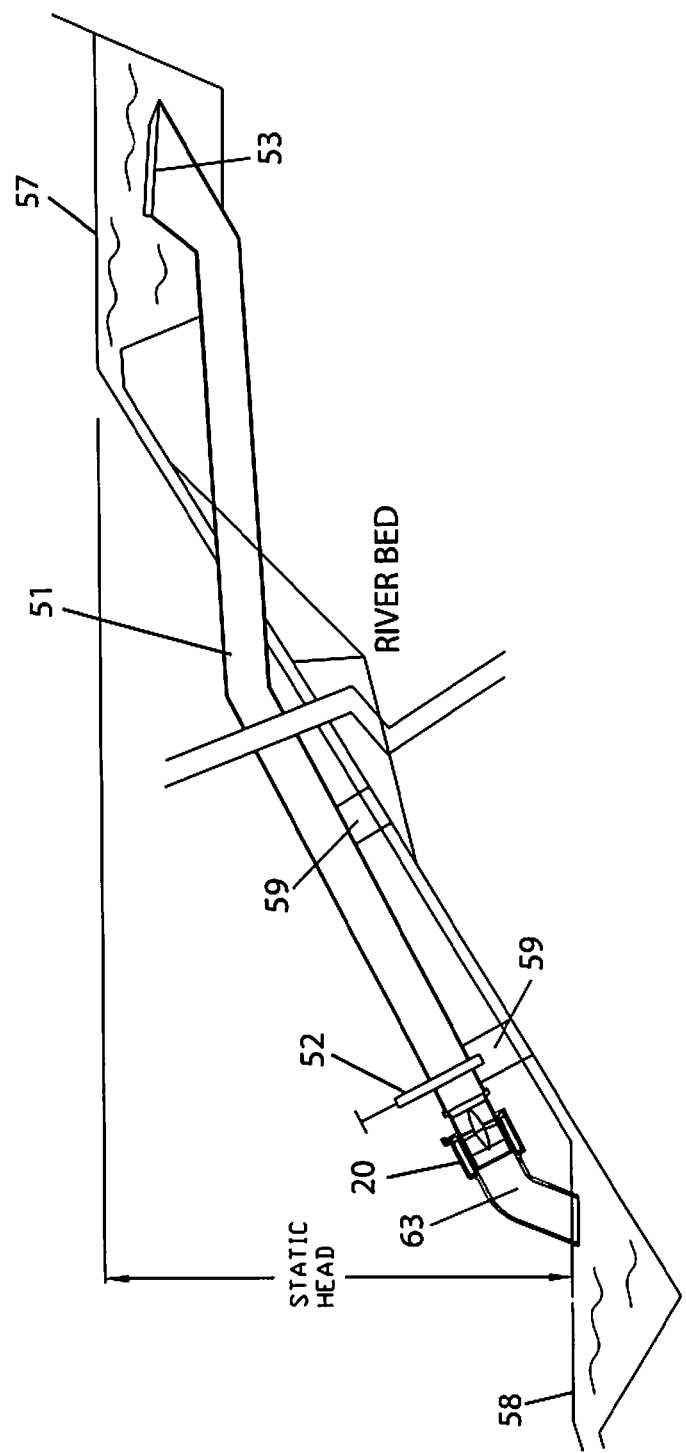
FIG. 9A is an elevation partial section of the hydroelectric power generator applied in dam-less run of waterway location.

FIG. 9A shows the inventive turbine/generator 20 in a non-dam application using the natural slope and features (i.e., local pools) of a suitable river bed. Grid bars 53 at the intake end of penstock 51 block debris from entering device 20. Penstock 51 is mounted on suitably-positioned supports 59. The static head of the river bed site spans between upstream level 57 and downstream level 58, causing water flow through device 20 to extract power from such flow through penstock 51.

Figure 10:
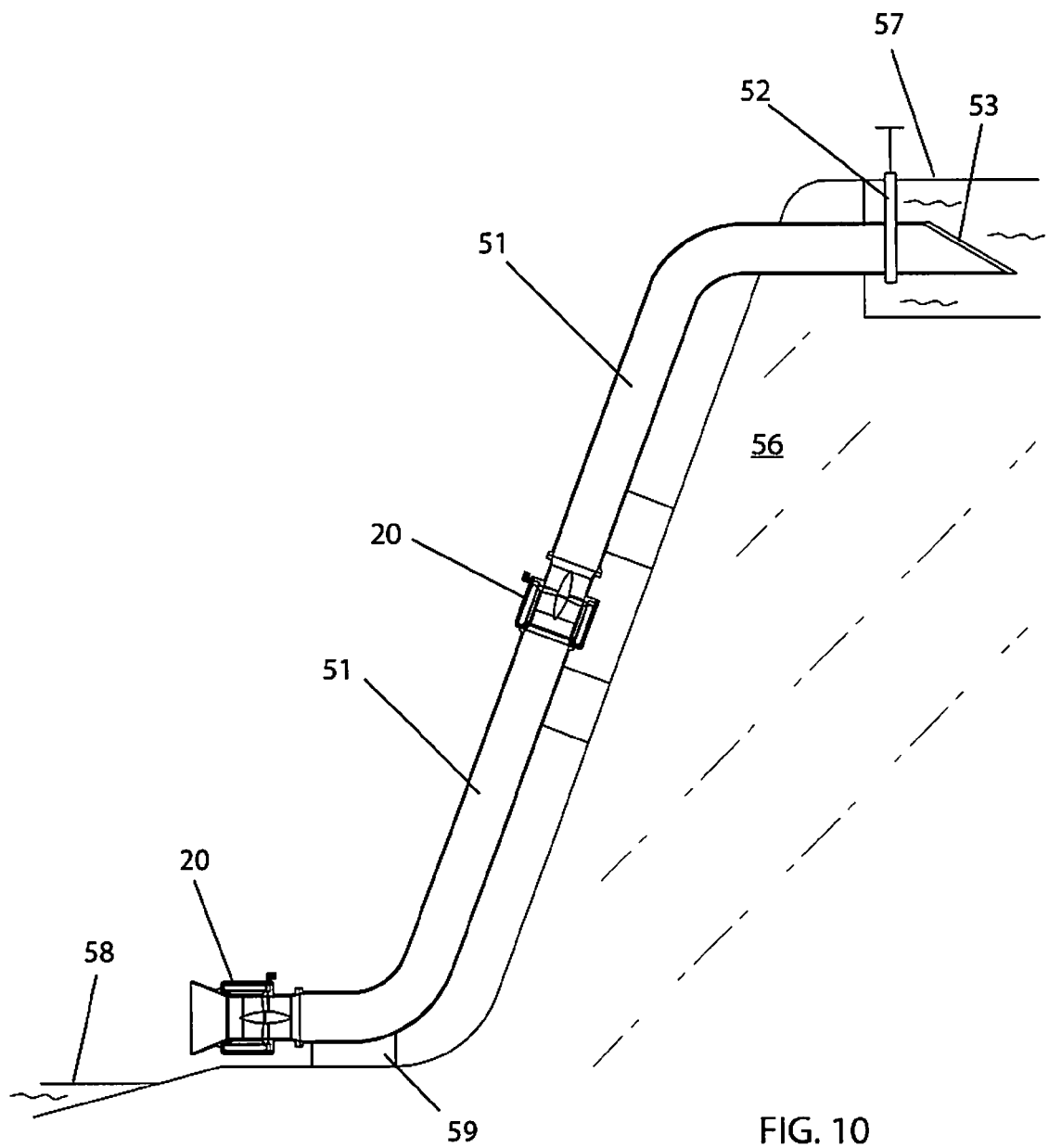
FIG. 10 is an elevation partial section of the hydroelectric power generator in an in-line static-head arrangement, using a dam with two turbines in a cascaded configuration.

FIG. 10 shows the placement of two units in series to deal with higher static heads, placing two identical turbine/generators 20 in line. The second device 20 is also placed in-line with penstock 51 and may not require additional support. The conventional method to handle the higher static head is to use a single, different-style turbine hydrodynamic design that is significantly more expensive to manufacture and far exceeds the cost of two of the present inventive devices 20. Multiple integrated turbine/generators 20 can be cascaded in this manner to cover a wide range of static head pressures. Shut-off valve 52, when closed, stops the operation of the turbine/generators 20 to allow inspection and maintenance and also cleaning of grid bars 53.

Figure 11:
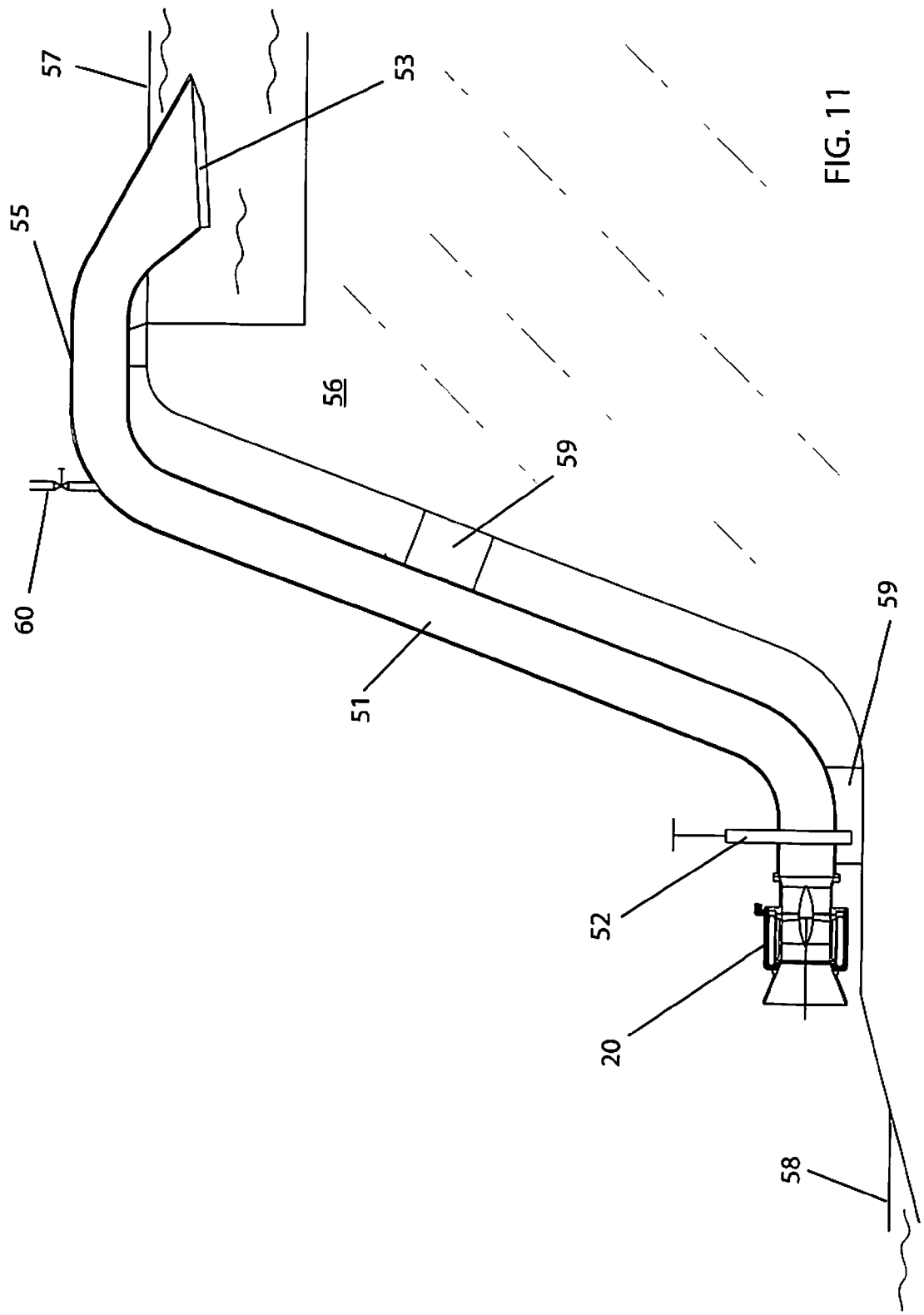
FIG. 11 is an elevation partial section of the hydroelectric power generator in an in-line static-head arrangement, using a dam with a siphon and priming device.

FIG. 11 illustrates a method of generating power from an existing dam without the need to modify the dam. A siphon 55 is placed over the dam with one end connected to penstock 51 and the other end submerged below upstream water level 57 below the waterline. The upstream end of siphon 55 is provided with grid bars 53 to prevent debris from entering siphon 55. Shut-off valve 52 is placed in penstock 51 adjacent to device 20, and a water-supply valve 60 is placed on top of siphon 55 but over penstock 51 (see FIG. 11) to ensure that water from valve 60 flows into penstock 51. To prime siphon 55, shut-off valve 52 is closed and water-supply valve 60 is opened filling penstock 51 with water. After penstock 51 is filled, water-supply valve 60 is closed and shut-off valve 52 is opened to start the water flow through device 20.

Figure 12:
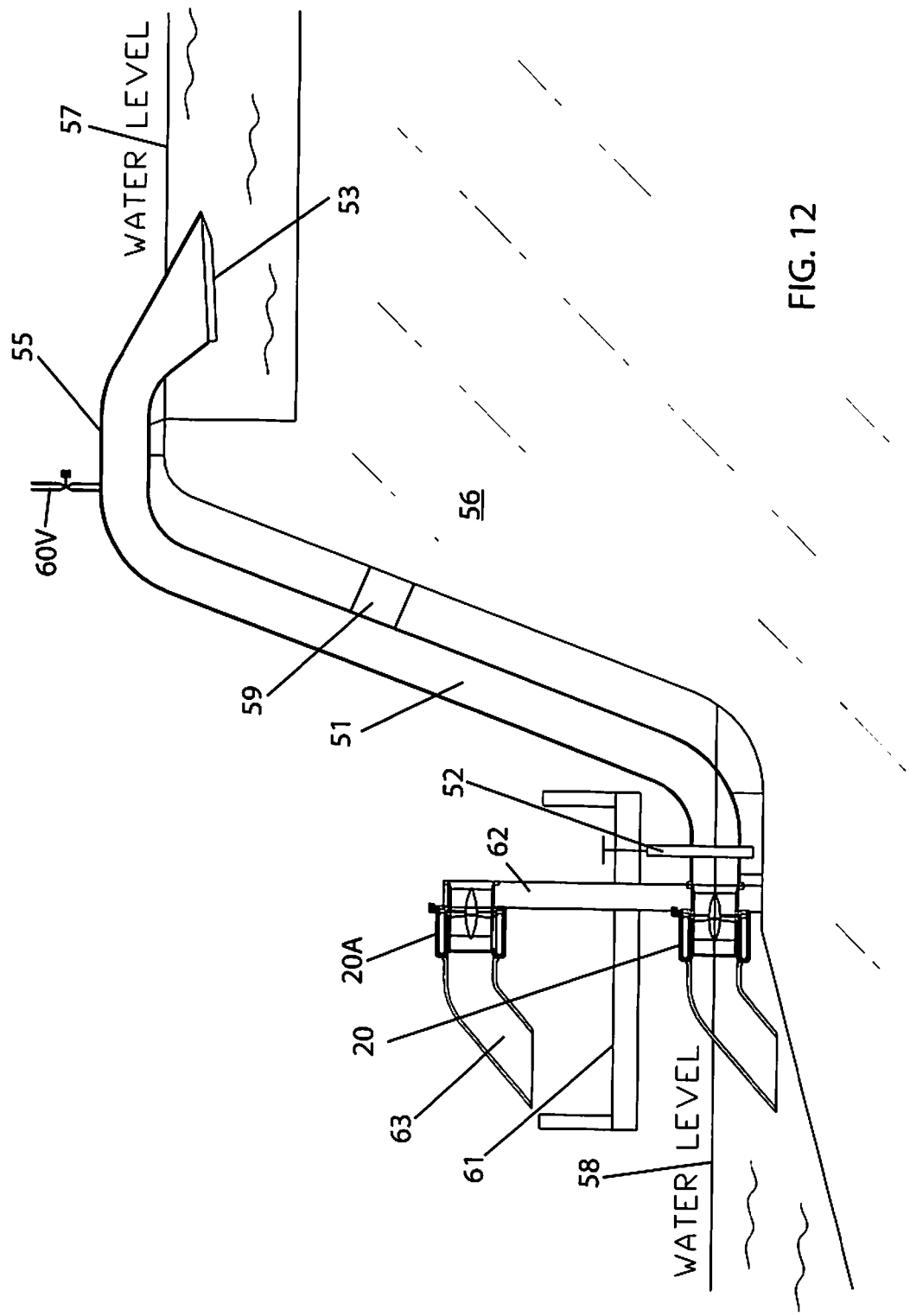
FIG. 12 is an elevation partial section of the hydroelectric power generator in an in-line static-head arrangement, using a dam with a turbine partially under the water.

FIG. 12 illustrates a second method of priming siphon 55. Since integrated turbine/generator 20 hydrodynamic and electrical functions are fully reversible, applying power to device 20 will turn it into an axial flow pump. An axial flow pump needs to be submerged at least up to the shaft centerline to prime itself. Further, to prevent device 20 in pump mode from aspirating air, a tailrace 63 is placed on device 20. When device 20 is energized, it will pump water up penstock 51 and through siphon 55. As soon as water exits through grid bars 53, the function of device 20 is changed back to power generation mode, establishing siphon flow through siphon 55.

Since device 20 is below downstream water level 58, servicing device 20 in this position would be difficult. FIG. 12 also shows the installation of a catwalk 61 and vertical slide track 62 enabling device 20 to be raised for access for inspection and maintenance. Device 20A is device shown in such raised position.

A third method to prime siphon 55 is also shown in FIG. 12. Vacuum valve 60V, place at the high point of siphon 55, is used to apply vacuum (vacuum pump not shown) to siphon 55 in order to draw water up into siphon 55, filling penstock 51. Siphon 55 start-up proceeds as previously described.

As shown above, the turbine/generator 20 function may be reversed, changing device 20 from a hydroelectric power generator to an axial flow pump and electric motor. This feature allows device 20 to function as an energy storage device by pumping water to a higher elevation level in a reservoir and reclaiming the power later by running device 20 as a turbine/generator. Electronic commutation controller 44 requires an input signal to switch functions from power generation to priming and pumping to reverse operation to store energy. Producing such a signal and control switching of controller 44 is well known to those skilled in the art.

Figure 14:
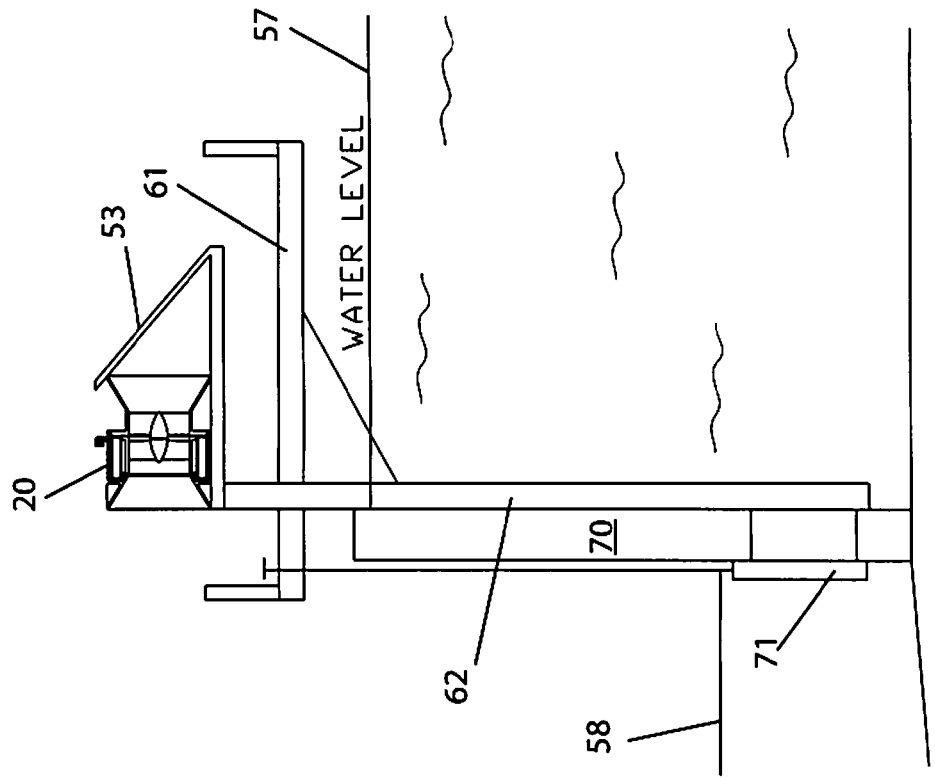
FIG. 14 is an elevation partial section of the hydroelectric power generator in a static-head arrangement, using a weir with the turbine/generator in a raised position for service.
Figure 13:
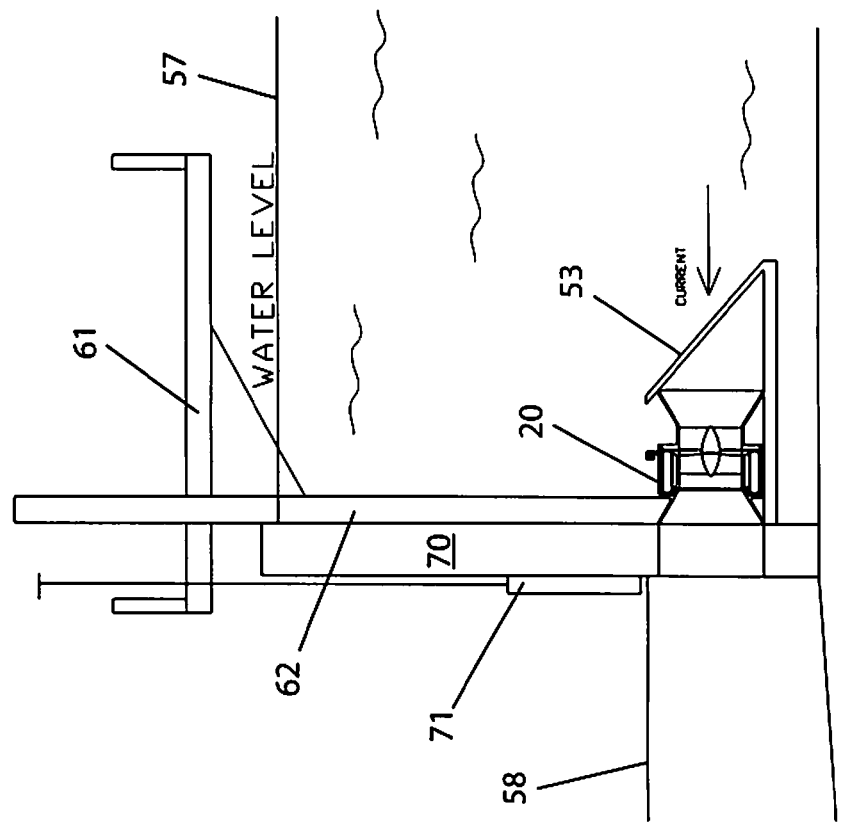
FIG. 13 is an elevation partial section of the hydroelectric power generator in a static-head arrangement, using a weir with a turbine/generator in an operating position.

FIG. 13 shows the placement of turbine/generator 20 at the bottom of a weir 70. A slide valve 71 is shown in an open position and can be closed to stop the water flow through device 20. Device 20 can be raised along vertical slide track 62 for service. FIG. 14 shows slide valve 71 in a closed position and device 20 out of the water in such a service position. Catwalk 61 provides access for inspection and maintenance.

FIG. 15 shows turbine/generator 20 mounted on a skid 75 and submerged below water level 78 on the bottom 76 of a waterway. The water current represented by arrow 77 causes device 20 to produce electricity as explained in more detail above. Grid bars 53 deflect debris from entering device 20. FIG. 15A represents an end view of skid 75 and device 20 on the bottom 76 of a waterway.

Figures 16, 16A:
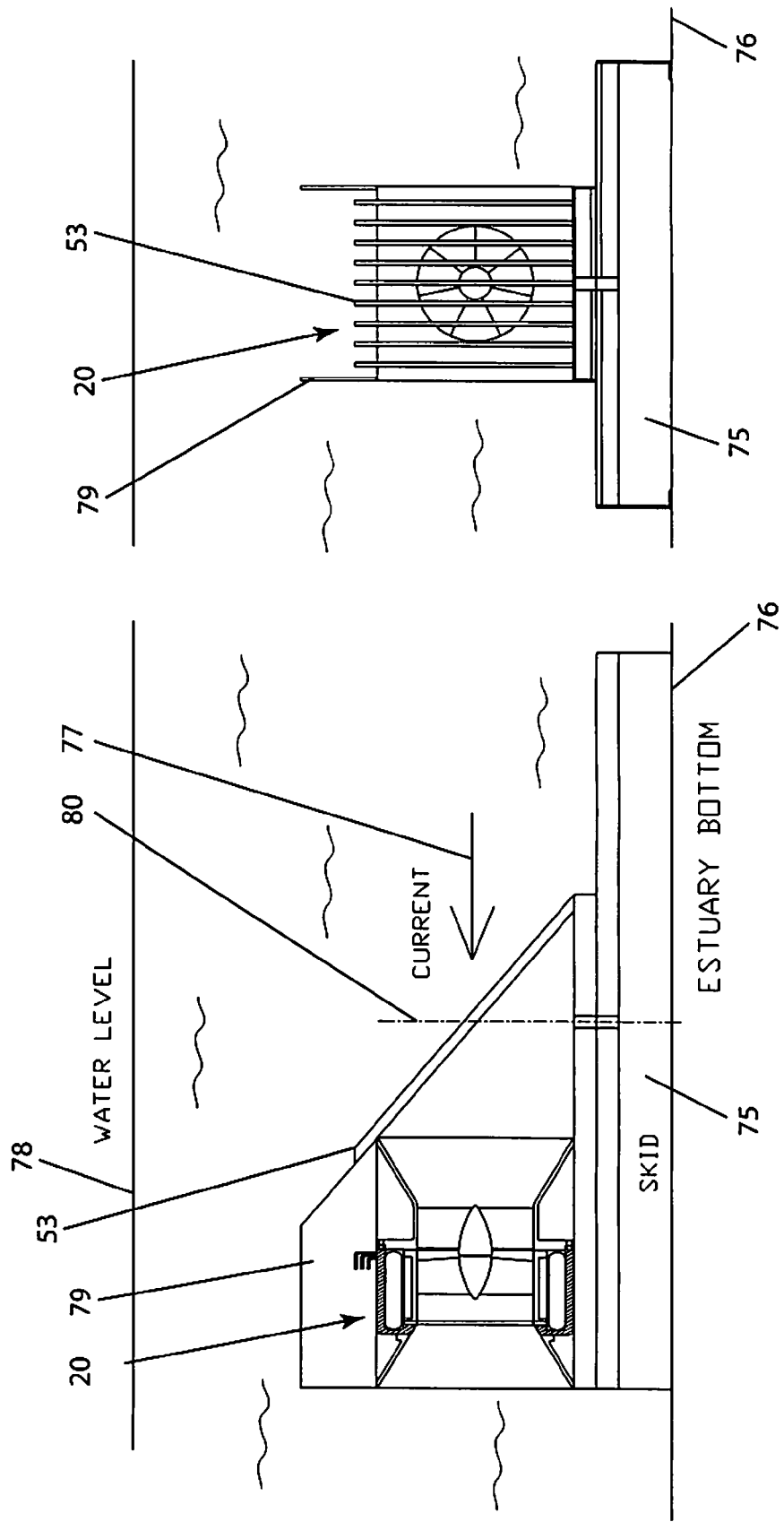
FIG. 16 is an elevation partial section of the hydroelectric power generator in an in-stream arrangement, on a skid on the bottom of a waterway and capable of alignment with the current.
FIG. 16A is an end view of the hydroelectric power generator in the arrangement of FIG. 16.
Figures 17, 17A:
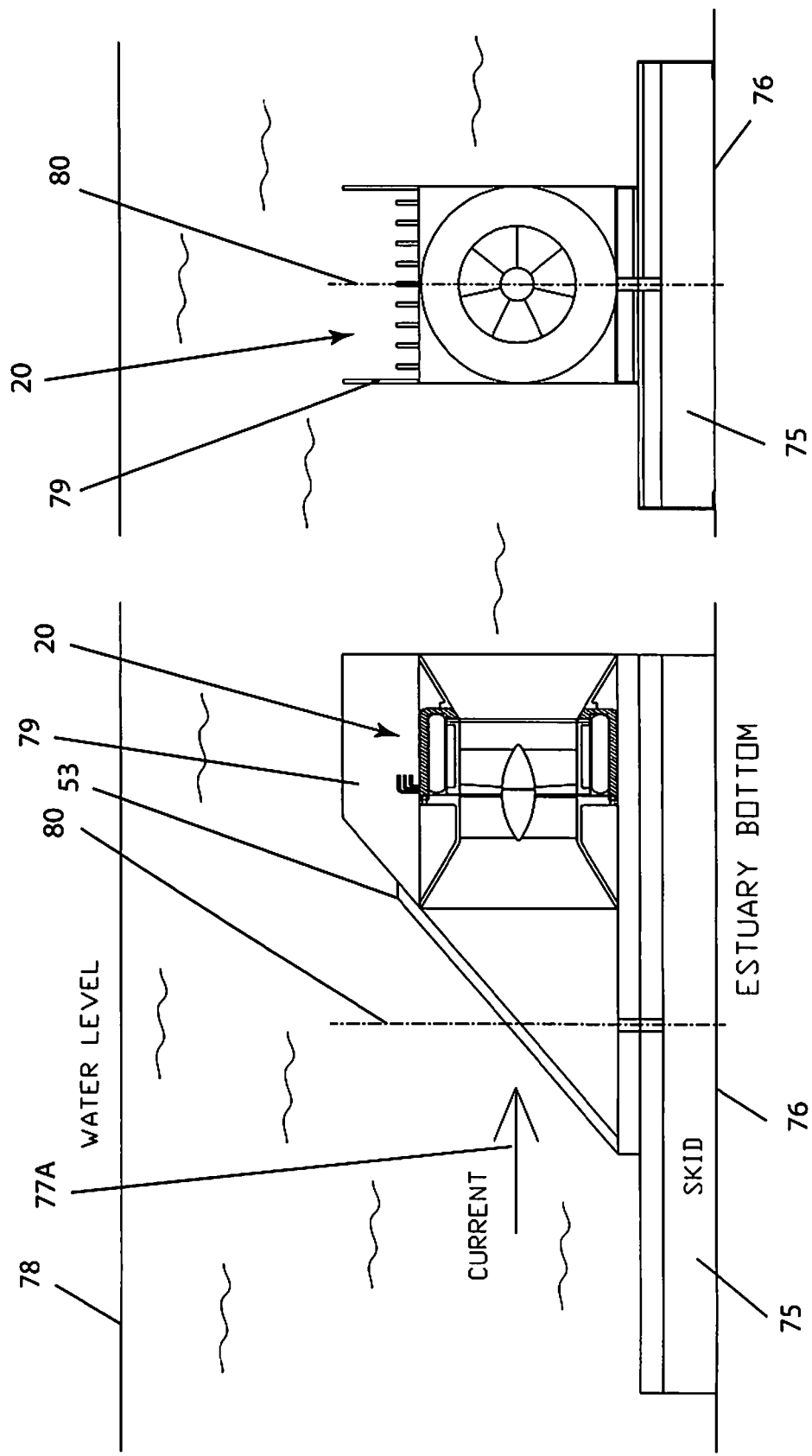
FIG. 17 is an elevation partial section of the hydroelectric power generator in the arrangement of FIG. 16 but with the water current flowing in the opposite direction.
FIG. 17A is an end view of the hydroelectric power generator in the arrangement of FIG. 17.

FIG. 16 shows a turbine/generator 20 mounted on skid 75 below waterline 78 with a vertical axis pivot 80 allowing the device 20 to rotate about axis 80 and align itself with current 77. One or more vanes 79 are placed on device 20 to align device 20 with the prevailing current direction. FIG. 17 shows the position of device 20 aligned with the reversed current 77A. FIGS. 16A and 17A show end views of the respective positions of device 20 on skid 75.

Figure 18:
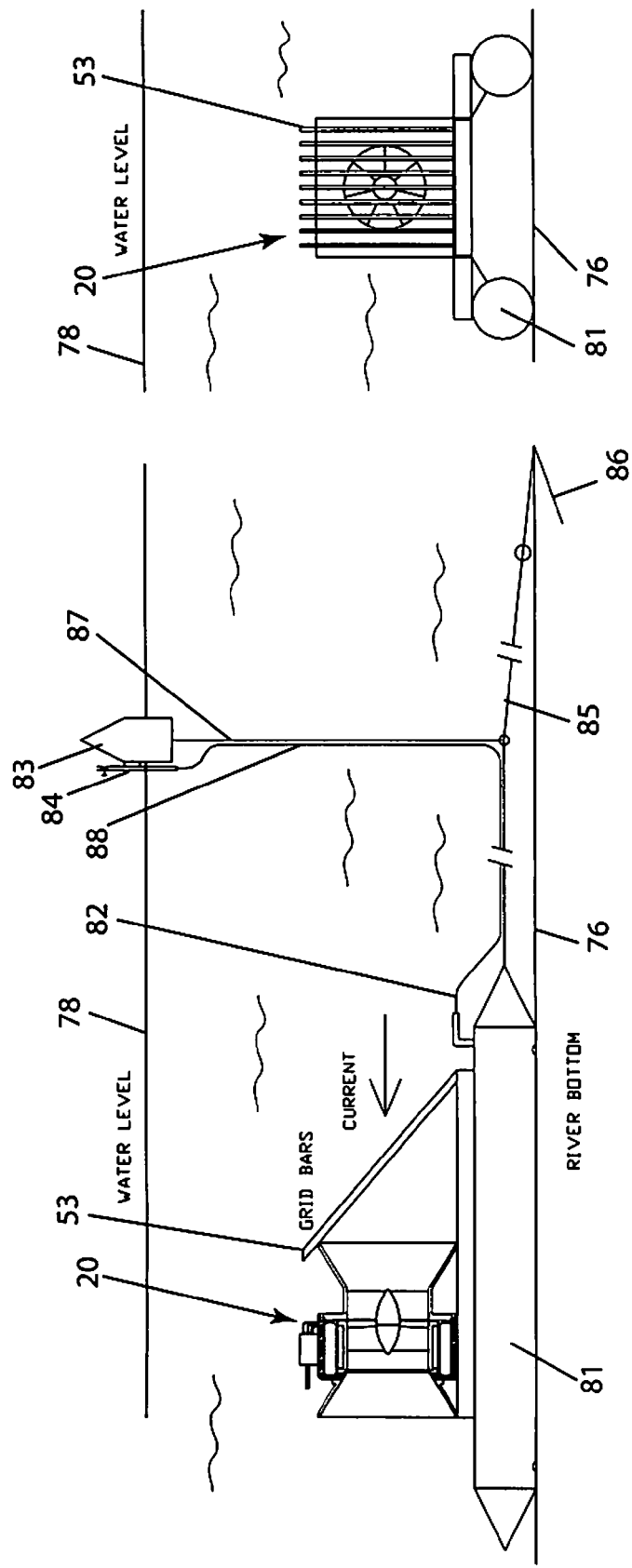
FIG. 18 is an elevation partial section hydroelectric power generator in an in-stream arrangement, on submerged floats.
Figure 19:
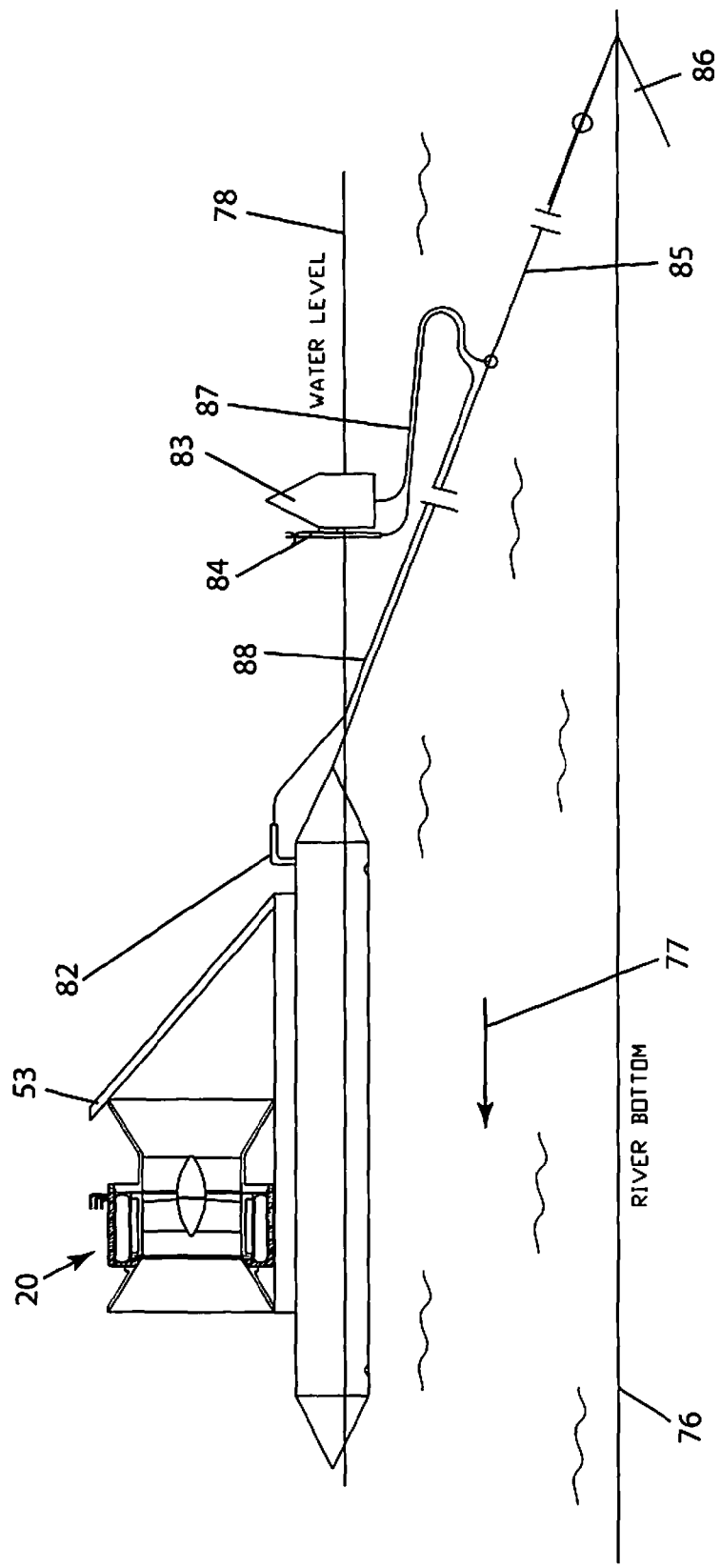
FIG. 19 is an elevation partial section hydroelectric power generator in an in-stream arrangement, on raised floats for maintenance and service.

FIG. 18 shows a turbine/generator 20 mounted on submersible floats 81 which are submerged by internal flooding. An anchor 86 with an anchor line 85 attached to floats 81 keeps floats 81 from moving with the current. Anchor line 85 has a buoy 83 attached via line 87. Attached to buoy 83 is a fitting 84 and a hose 88 connected to floats 81 to provide air pressure to displace the water in floats 81, thus forcing floats 81 and device 20 to the surface for inspection and maintenance. FIG. 19 shows device 20 out of the water floating on surface 78 on floats 81. To return device 20 to service, the air is let out through fitting 84. Buoy 83 identifies the location of device 20 when submerged. By supplying the appropriate amount of air, device 20 can be given neutral buoyancy and with the help of a combination of anchors, buoys and attachment to fixed and land based structures (not shown), the unit can be suspended in the current of a waterway away from surface 78 or bottom 76. FIG. 18A shows an end view of the device 20 sitting on bottom 76.

Figure 20A:
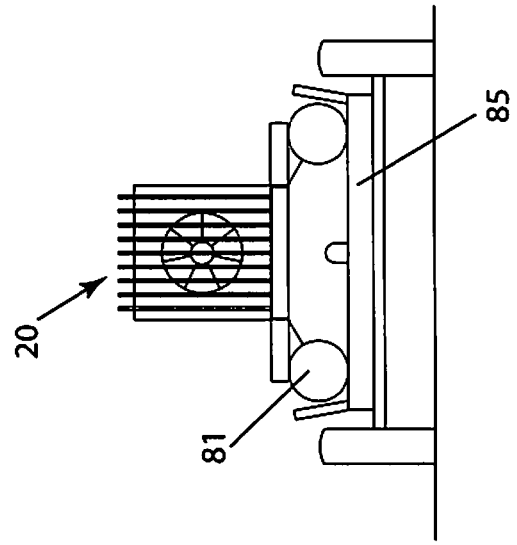
FIG. 20A is the end view of a hydroelectric power turbine in the arrangement of FIG. 20.
Figure 20:
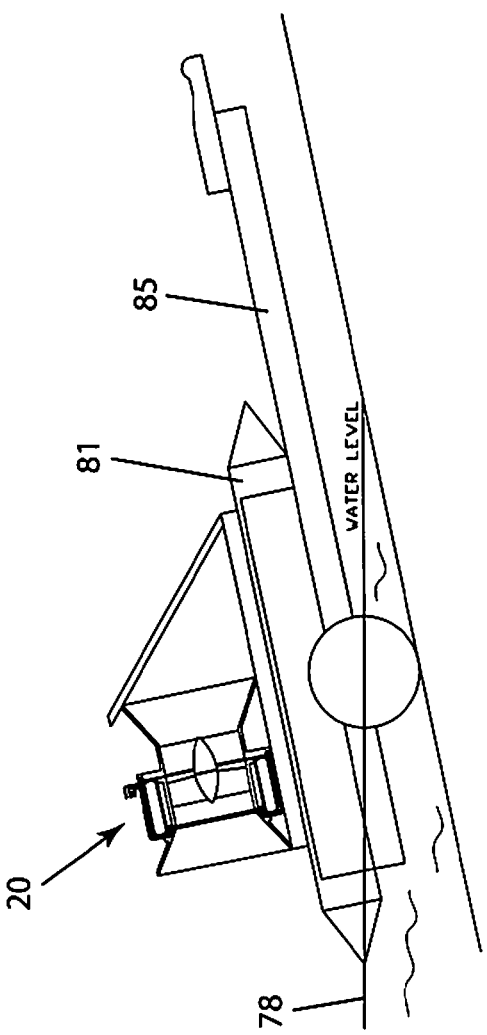
FIG. 20 is the elevation view of a hydroelectric power turbine on floats placed on a trailer for transportation and launching from a boat ramp.

The transportation and placement of turbine/generators 20 on floats can be accomplished in the same way boats are launched from boat ramps on a trailer 85 as is shown in FIGS. 20 and 20A. Larger units can be launched via commercial boat yards.

An in-stream power generator lacks the static head to provide substantial power and relies strictly on the kinetic energy from the water velocity. As a result, the power generated is a fraction of the power generated with static head systems. In order to operate the inventive power-generating device 20 efficiently, more power from other turbines, mechanically linked to device 20 can increase the power generated. FIGS. 21 and 21A illustrates such a system. Turbine/generator 20 is coupled to auxiliary turbines 86 by means of drive lines 88, thus providing triple the power from device 20. A set of baffles 89 serve to separate the exit stream of the upstream turbine (device 20 or turbine 86) from current flow into subsequent turbines. A set of grid bars 87 serve to keep out debris from turbines 86. As before, device 20 and turbines 86 are mounted on submerging floats 81 to provide easy inspection and maintenance.

Figures 22, 22A:
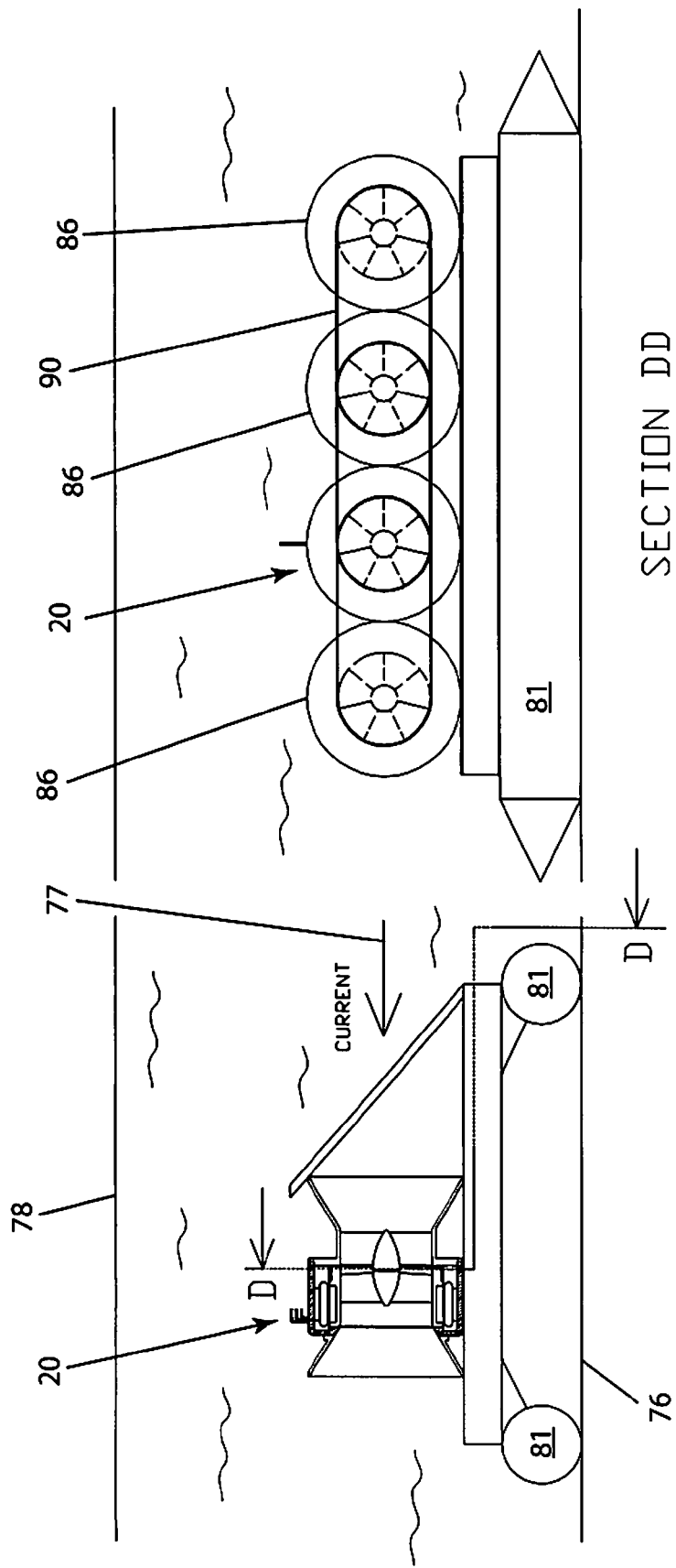
FIG. 22 is an elevation partial section of flanked in-stream turbines coupled with drive belts to the integrated turbine/generator on submerged floats.
FIG. 22A is an end view of flanked in-stream turbines in the arrangement of FIG. 22.

Another method of driving turbine/generator 20 is shown in FIGS. 22 and 22A by connecting adjacent turbines 86 with device 20 via belt drives 90. Part of rotor 28 is provided with one or more grooves for interconnecting drive belts 90 transmitting power generated by the turbines 86 to the generator of device 20. The assembly can be mounted on a set of submersible floats 81.

Figures 23, 23A:
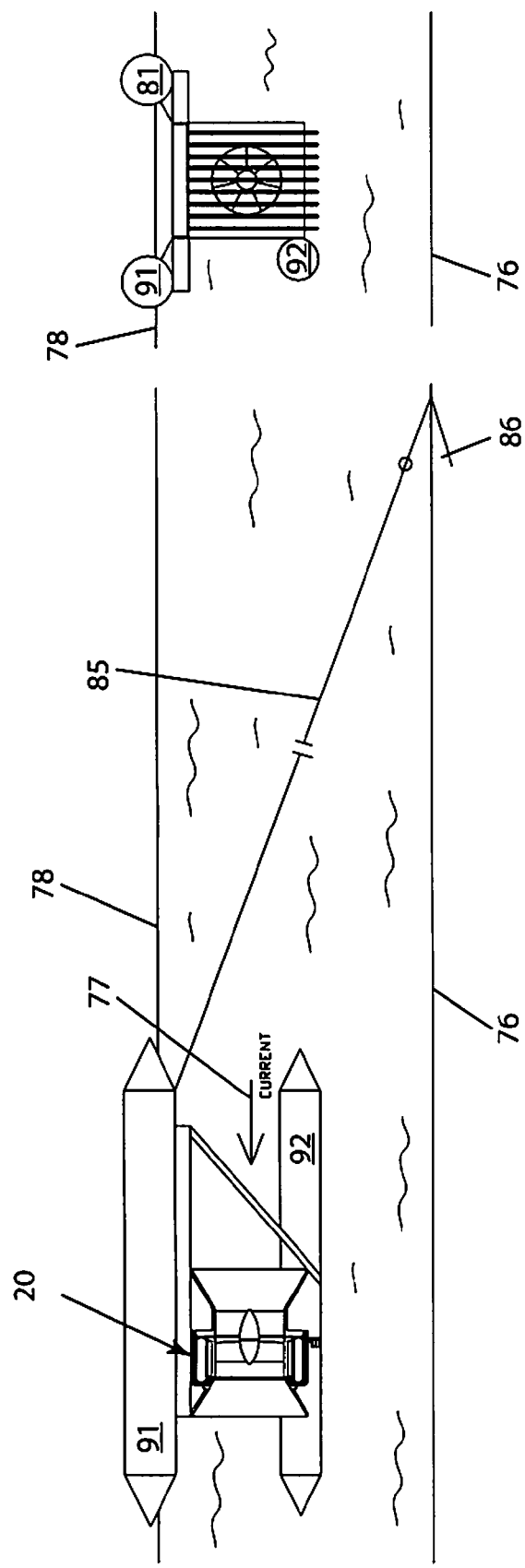
FIG. 23 is an elevation view partial section hydroelectric power generator in an in-stream arrangement, suspended from floats.
FIG. 23A is an end view of the hydroelectric power generator in the arrangement of FIG. 23.

Yet another method of suspending turbine/generator 20 in waterway current 77 is shown in FIGS. 23 and 23A where it is suspended from floats 81 and 91. This method is preferred if waterway bottom 76 is uneven or rocky and proper alignment of device 20 on bottom 76 is not feasible. Floats 81 and 91 are anchored in the stream by anchor 86 and anchor line 85. Other methods of anchoring such as fastening to bridge pylons or points on land (not shown) can maintain the floats in position. To inspect and maintain device 20, float 91 is sealed to prevent sinking to bottom 76.

As shown in FIGS. 24A, 24B, 24C and 24D, by submerging float 81 and subsequently floating auxiliary float 92 and then re-floating float 81, device 20 can be revolved to position device 20 above surface 78 for inspection and maintenance. By reversing this floatation cycle, device 20 can be returned to service.

The invention claimed is:

1. Hydroelectric power-generating apparatus comprising:
   a fluid inlet;
   a diffuser having (1) at least one vane supporting a diffuser hub and (2) a rotor rotatably supported by the diffuser hub and having: (a) impeller blades; (b) an impeller hub; and (c) a shroud at the periphery of the rotor, the shroud including at least one magnet mounted thereto; and
   a housing surrounding the shroud and having a rigidly-attached stator, the stator comprising a plurality of stator segments, each segment including laminations and at least one electrical coil,
   whereby a flow of fluid through the diffuser and rotor causes the rotation of the rotor and the at least one magnet induces an electric current in the coils.

2. The hydroelectric power-generating apparatus of claim 1 wherein the diffuser is removably attached to the housing.

3. The hydroelectric power-generating apparatus of claim 1 wherein each stator segment is encapsulated with composite material.

4. The hydroelectric power-generating apparatus of claim 1 wherein the housing has cooling fins to cool the stator.

5. The hydroelectric power-generating apparatus of claim 1 wherein the each stator segment is removable.

6. The hydroelectric power-generating apparatus of claim 1 wherein the stator segments are held in place by spacer segments removably fastened to the housing.

7. The hydroelectric power-generating apparatus of claim 1 wherein the at least one rotor magnet is held in place by a band around the shroud.

8. The hydroelectric power-generating apparatus of claim 1 wherein the rotor is segmented and each rotor segment has one or more impeller blades.

9. The hydroelectric power-generating apparatus of claim 8 wherein the at least one magnet is placed at the tip(s) of the one or more impeller blades.

10. The hydroelectric power-generating apparatus of claim 1 further including an electronic commutation controller configured to reduce or increase generator output by increasing or reducing the torque load to control water flow through the power-generating apparatus.

11. The hydroelectric power-generating apparatus of claim 1 further including an electronic commutation controller connected to the at least one coil and configured to maintain a fixed AC output frequency by controlling the torque load on the stator.

12. The hydroelectric power-generating apparatus of claim 1 whereby the apparatus is configured such that when electric power is applied to the at least one coil, the apparatus pumps fluid.

13. A hydroelectric power-generating system including a plurality of hydroelectric power-generating devices placed in series in a penstock which directs fluid from an upstream fluid level through the hydroelectric power-generating devices downstream, each device having:
    a fluid inlet;
    a diffuser having (1) at least one vane supporting a diffuser hub and (2) a rotor rotatably supported by the diffuser hub and having: (a) impeller blades; (b) an impeller hub; and (c) a shroud at the periphery of the rotor, the shroud carrying at least one magnet; and
    a housing surrounding the shroud and having a rigidly-attached stator, the stator comprising a plurality of stator segments, each segment including laminations and at least one electrical coil,
    whereby a flow of fluid through the diffusers and rotors causes the rotation of the rotors and the magnets, thereby inducing an electric current in the coils.

14. Hydroelectric power-generating apparatus comprising:
    a fluid inlet;
    a diffuser having (1) at least one vane supporting a diffuser hub and (2) a rotor rotatably supported by the diffuser hub and having: (a) impeller blades; (b) an impeller hub; and (c) a shroud at the periphery of the rotor, the shroud including at least one magnet mounted thereto;
    a housing surrounding the shroud and having a rigidly-attached stator including laminations and at least one electrical coil; and
    an electronic commutation controller connected to the at least one coil and configured to maximize generator output as fluid flow through the apparatus varies,
    whereby fluid flow causes rotation of the rotor, the at least one magnet induces an electric current in the at least one coil.

15. Hydroelectric power-generating apparatus comprising:
    a fluid inlet;
    a diffuser having (1) at least one vane supporting a diffuser hub and (2) a rotor rotatably supported by the diffuser hub and having: (a) impeller blades; (b) an impeller hub; and (c) a shroud at the periphery of the rotor, the shroud including at least one magnet mounted thereto;
    a housing surrounding the shroud and having a rigidly-attached stator including laminations and at least one electrical coil; and
    an electronic commutation controller connected to the at least one coil and configured to switch from a power-generation mode to an electric-motor mode, thereby changing the turbine into a pump.

16. Hydroelectric power-generating apparatus comprising:
    a fluid inlet;
    a diffuser having (1) at least one vane supporting a diffuser hub and (2) a rotor rotatably supported by the diffuser hub and having: (a) impeller blades; (b) an impeller hub;

and (c) a shroud at the periphery of the rotor, the shroud including at least one magnet mounted thereto;

a housing surrounding the shroud and having a rigidly-attached stator including laminations and at least one electrical coil; and an electronic commutation controller connected to the at least one coil and configured to enable power generation when fluid flows in one direction and fluid pumping in the opposite direction when electric power is applied.

17. Hydroelectric power-generating apparatus comprising:

a fluid inlet;

a diffuser having (1) at least one vane supporting a diffuser hub and (2) a rotor rotatably supported by the diffuser hub, the rotor comprising a plurality of rotor segments each having one or more impeller blades; (b) an impeller hub; and (c) a shroud at the periphery of the rotor, the shroud including at least one magnet mounted thereto; and a housing surrounding the shroud and having a rigidly-attached stator including laminations and at least one electrical coil, whereby fluid flow causes rotation of the rotor, the at least one magnet induces an electric current in the coils.

* * * * *